(12) United States Patent
Winter

(10) Patent No.: US 7,147,268 B2
(45) Date of Patent: Dec. 12, 2006

(54) RECREATIONAL VEHICLE

(75) Inventor: Amos G Winter, Concord, NH (US)

(73) Assignee: Appropriate Combined Technologies, LLC, Santa Clara, CA (US)

( * ) Notice: Subject to any disclaimer, the term of this patent is extended or adjusted under 35 U.S.C. 154(b) by 110 days.

(21) Appl. No.: 10/500,523

(22) PCT Filed: Dec. 31, 2002

(86) PCT No.: PCT/US02/41854

§ 371 (c)(1),
(2), (4) Date: Jun. 30, 2004

(87) PCT Pub. No.: WO03/057527

PCT Pub. Date: Jul. 17, 2003

(65) Prior Publication Data

US 2005/0012353 A1    Jan. 20, 2005

Related U.S. Application Data

(60) Provisional application No. 60/345,735, filed on Dec. 31, 2001.

(51) Int. Cl.
B60P 1/00 (2006.01)

(52) U.S. Cl. .................. 296/156; 296/158; 296/164

(58) Field of Classification Search ............. 296/26.08, 296/26.12, 26.13, 26.14, 26.15, 156, 158, 296/164, 168

See application file for complete search history.

(56) References Cited

U.S. PATENT DOCUMENTS

| | | | | |
|---|---|---|---|---|
| 2,032,630 A * | 3/1936 | Northup | ...................... | 296/92 |
| 3,933,258 A * | 1/1976 | Forsyth et al. | .............. | 414/537 |
| 3,961,716 A * | 6/1976 | Renaud | ...................... | 296/158 |
| 4,268,209 A * | 5/1981 | Westerman | ................ | 414/462 |
| 4,854,631 A * | 8/1989 | Laursen | ...................... | 296/158 |
| 4,966,510 A * | 10/1990 | Johnson, Jr. | ................ | 410/26 |
| 5,170,901 A * | 12/1992 | Bersani | ................... | 296/26.14 |
| 5,393,094 A * | 2/1995 | Wardavoir | .................. | 280/775 |
| 6,015,180 A * | 1/2000 | Beuerle | ...................... | 296/95.1 |
| 6,026,923 A * | 2/2000 | Uphaus | ...................... | 180/312 |
| 6,108,983 A | 8/2000 | Dewald, Jr. et al. | | |
| 6,135,532 A * | 10/2000 | Martin | ........................ | 296/61 |
| 6,345,855 B1 * | 2/2002 | Hanser et al. | ........... | 296/26.14 |
| 6,447,048 B1 * | 9/2002 | Crean | ........................ | 296/168 |

OTHER PUBLICATIONS

"Clearly, we take The Scenic Routes", p. 1.
"We Raised the Standard This High", p. 1.
"SPECS", Sep. 2002, p. 72.
Jones, Lazelle D., "Everything But Room Service: Newell's Mansion On Wheels", FMC, Dec. 2002, pp. 84-88.
PCT International Search Report dated Jan. 27, 2004 of International Application No. PCT/US02/41854 filed Dec. 31, 2002.

* cited by examiner

*Primary Examiner*—Lori L. Coletta
(74) *Attorney, Agent, or Firm*—Maine & Asmus

(57) ABSTRACT

A motorized recreational vehicle of unibody construction having at least one expandable living compartment with flush floor and full ceiling and an disposed within the body of the vehicle, a storage area or garage disposed within the vehicle body between the bottom and the floor and accessible through the openable rear end, an integral heat exchanging climate control system, a retractable exterior entrance stair, pneumatically actuated components, and deformable members.

36 Claims, 18 Drawing Sheets

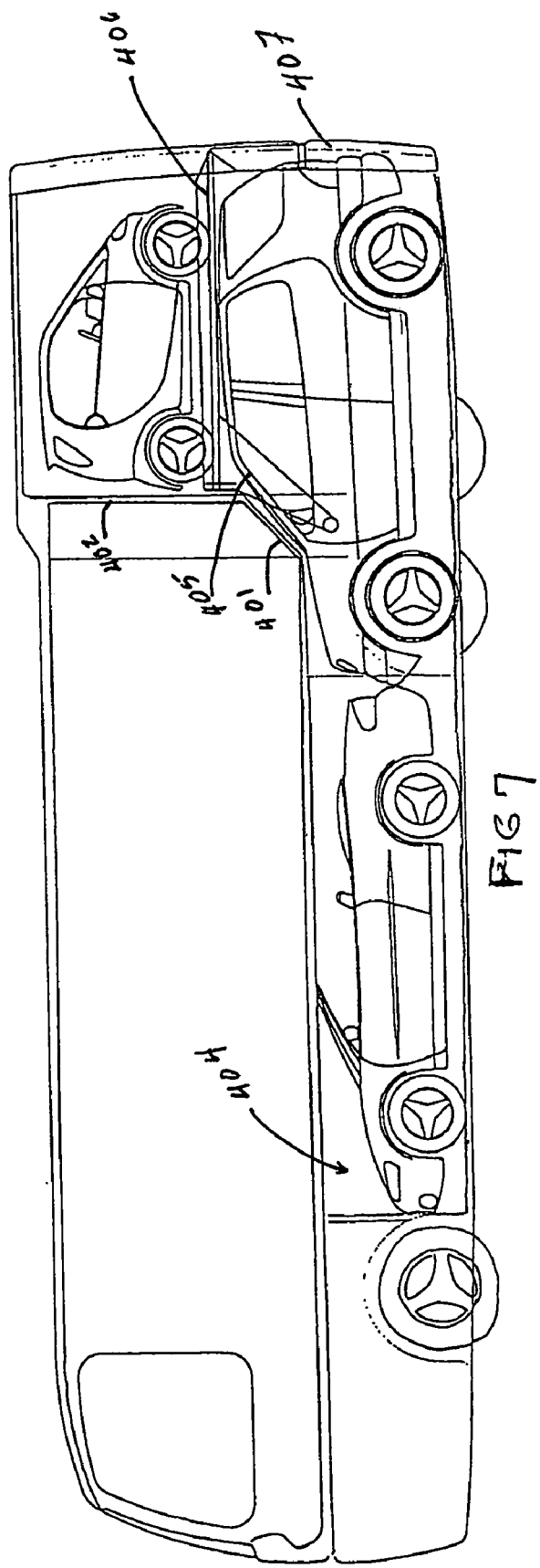

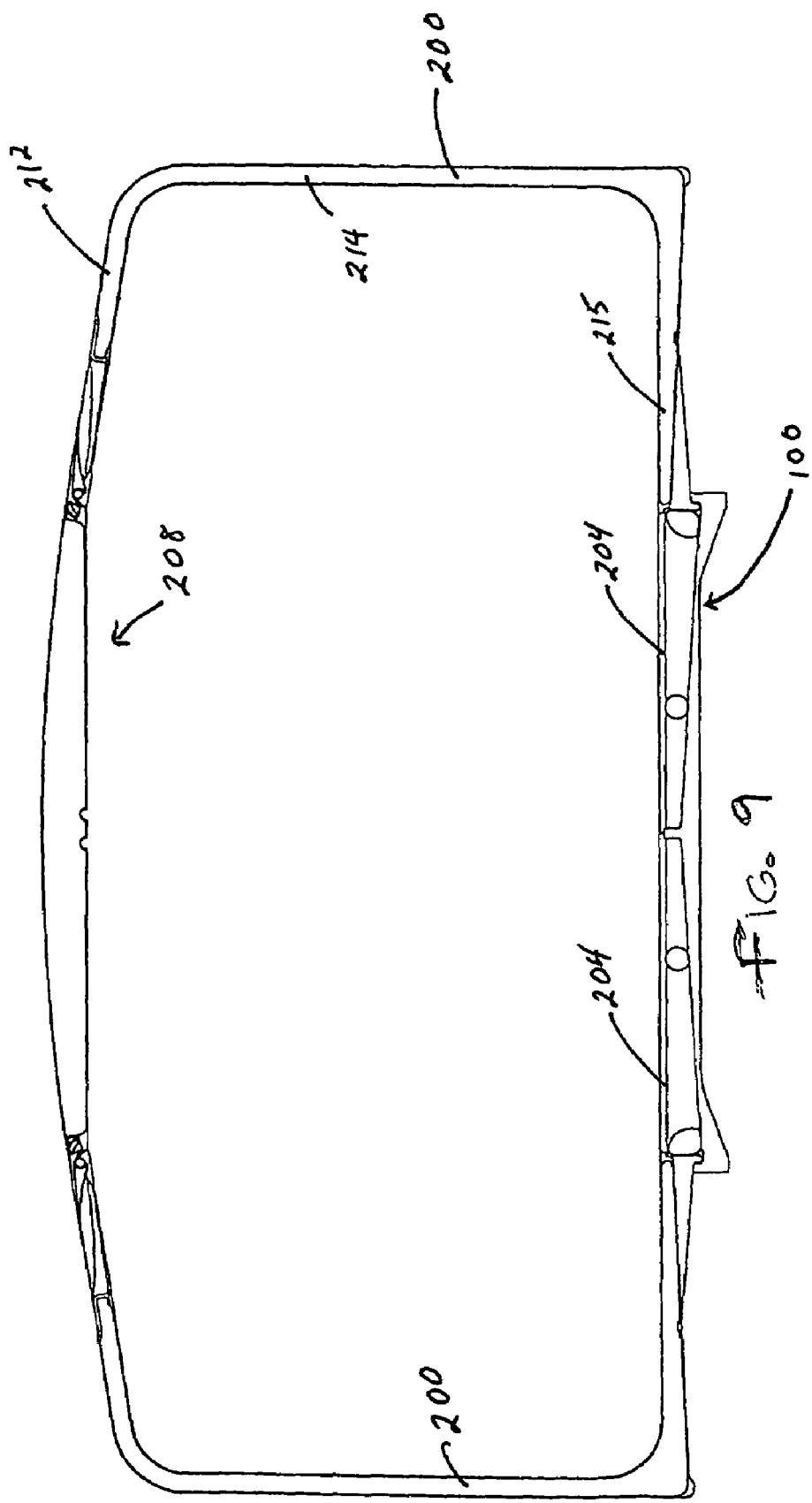

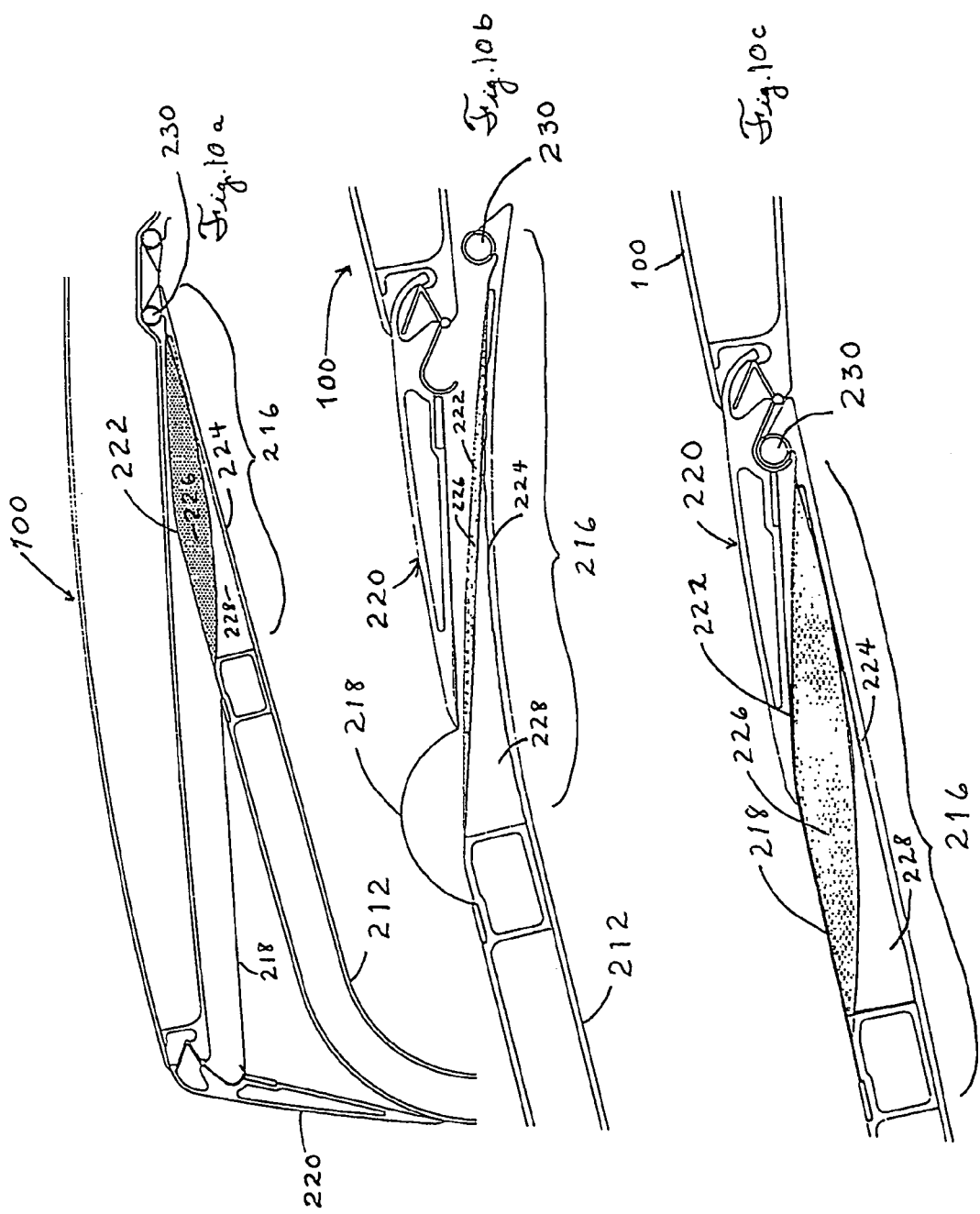

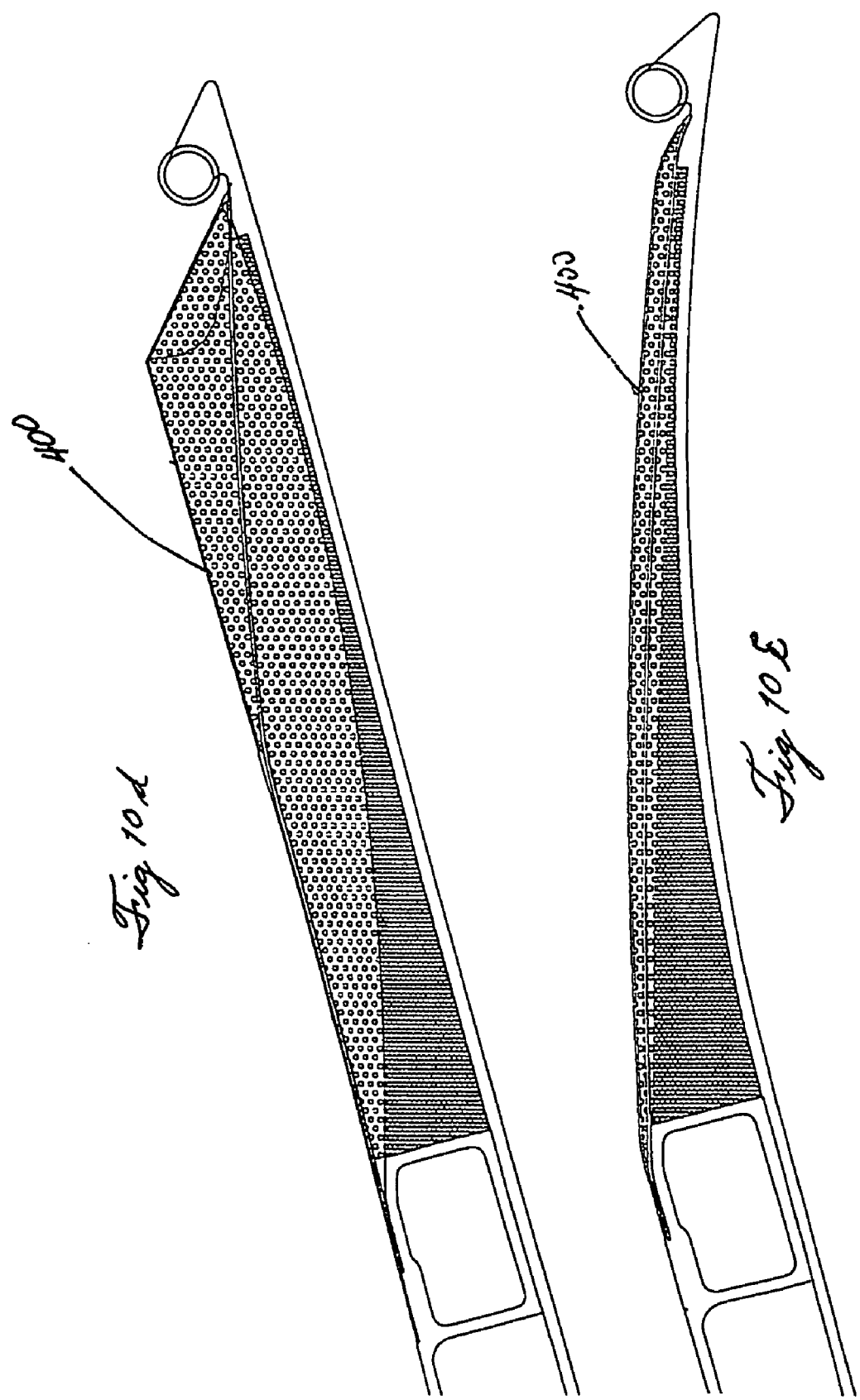

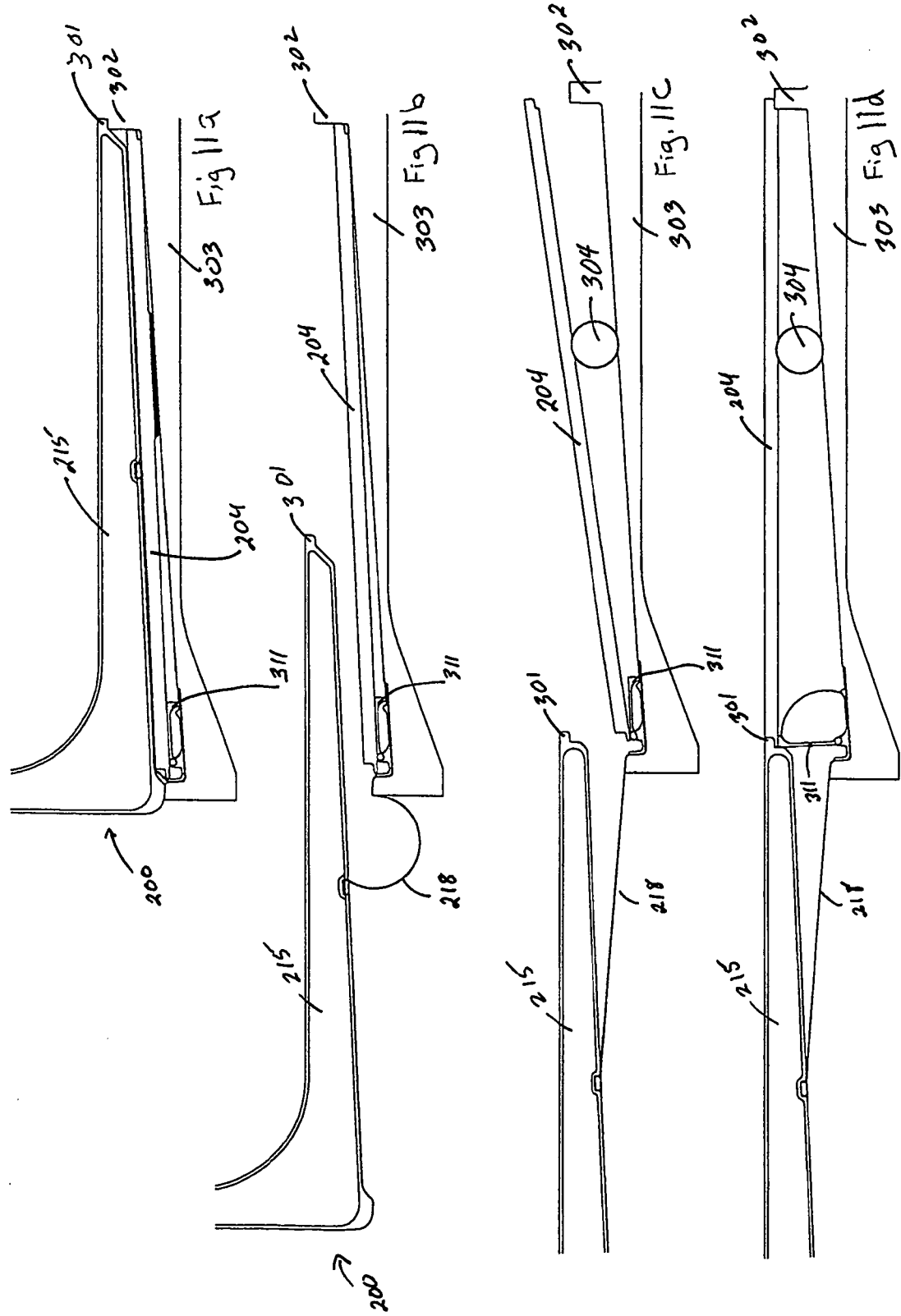

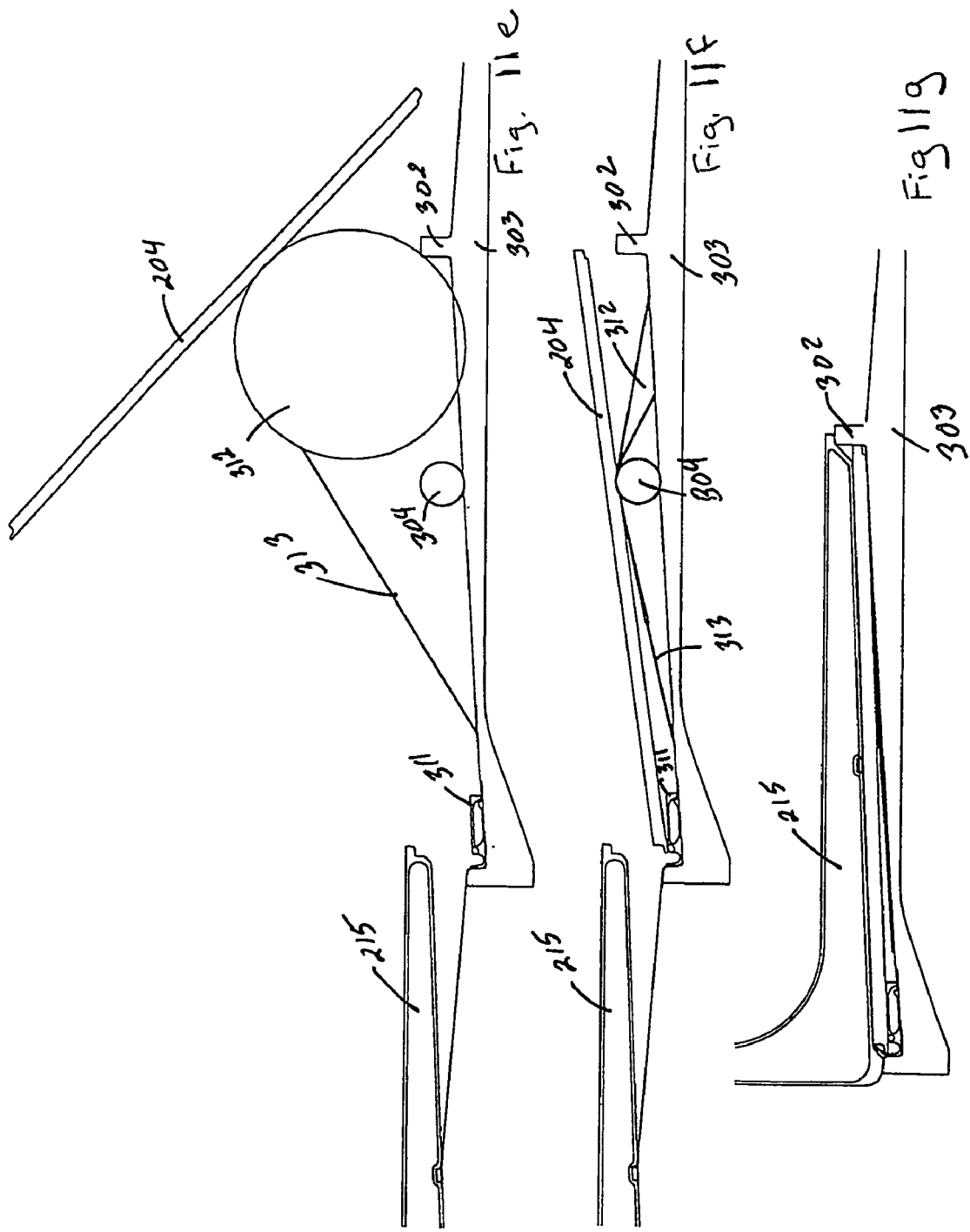

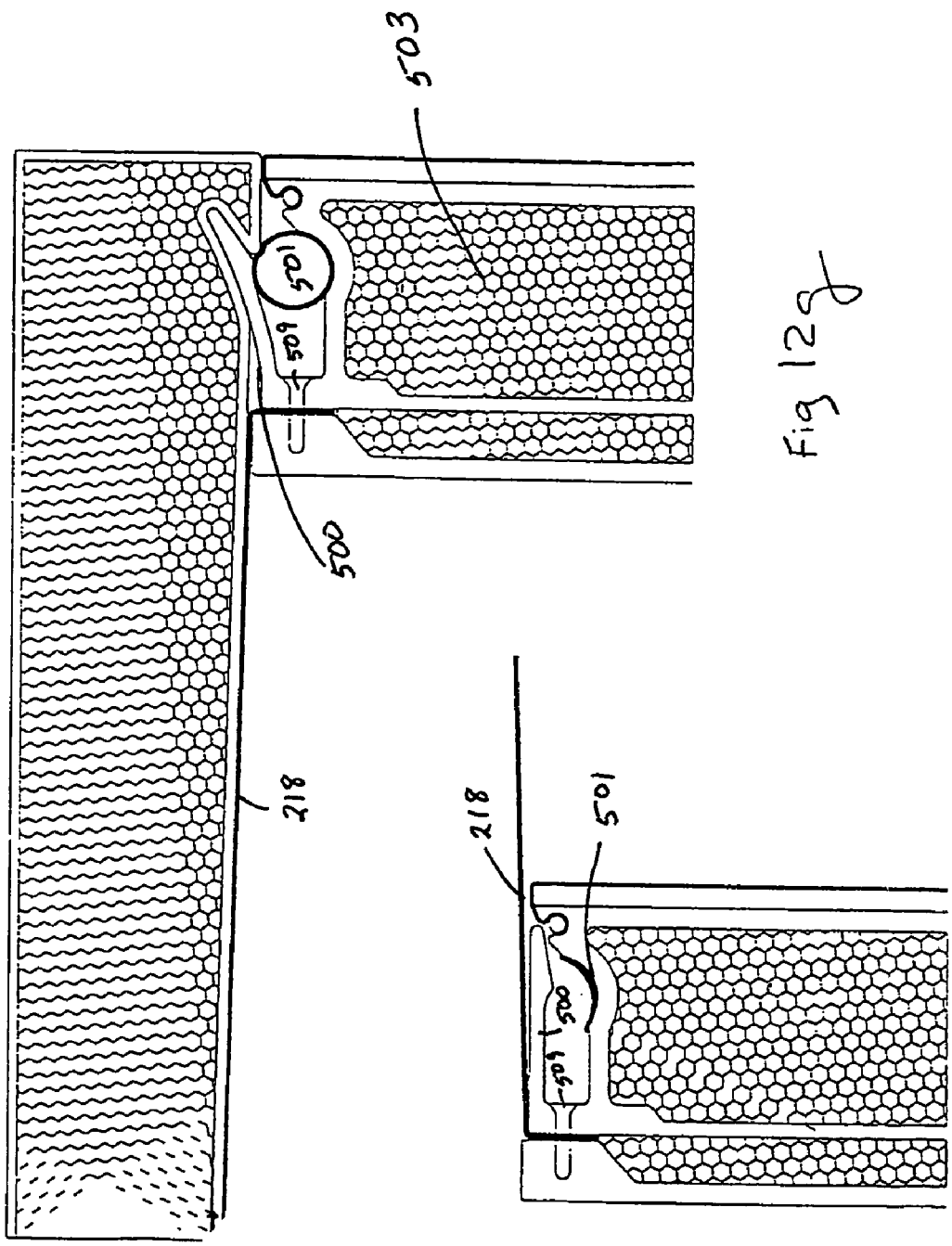

RECREATIONAL VEHICLE

CROSS REFERENCE TO RELATED APPLICATIONS

This application is a United States Non-Provisional Patent Application, claiming priority under 35 U.S.C. §119(e) of U.S. Provisional Patent Application Ser. No. 60/345,735, filed Dec. 31, 2001, by the same inventor, entitled IMPROVED RECREATIONAL VEHICLE, which is hereby incorporated by reference for all purposes.

FIELD OF THE INVENTION

This invention relates to the design and construction of recreational vehicles with on-board living space, and more particularly to recreational vehicles having convertible interior spaces, slide out expanding spaces, and provisions for internal stowage and transport of large items including small automobiles, sport vehicles, boats, all terrain vehicles, snowmobiles and the like.

BACKGROUND

One of the fastest growing segments of both the housing and transportation industries is the motor home. Many people, particularly retired people are making the motor home their only residence.

Motor homes have evolved from busses, trucks, and vans to the dedicated chassis, built from the ground up to be a motor home. Market demand for more functional space has evolved the "bump out" or "slide out", an enclosed section that pushes out from the side to expand the living area. A bump out may be over 20' long and may push out more than 3'. Some units even have opposite sides move out to expand the width of the living area from 8' to 12' or more. Another market driven improvement is the basement, a large storage space between the bottom and the floor much like the luggage compartments of an interstate passenger bus.

The automobile industry has evolved lighter, stronger, and safer structure by going from the body on frame configuration to a unibody construction. Even the fixed glass of modern automobiles is bonded to the frame to contribute to the rigidity of the total structure.

Motor homes haven't evolved as the automobile industry has. Even the best of dedicated motor home chassis derives most of its strength from the structure below the floor. Class A motor homes are constructed on bare, specially designed motor vehicle chassis. Generally, support and strength are derived solely from the chassis. The living enclosure is typically very light framing of multiple small dissimilar components.

The present market is being satiated with elaborate interiors and gadgetry but there is desire for more. The market wants the following:

Many motor homes tow a car for convenient transportation when they reach a destination. The mass of the motor home is sufficient challenge for most drivers without the addition of a vehicle in tow. There needs to be provision for a vehicle to be carried on board.

The basement storage was well received but there is still desire for more versatile space. People who can afford the motor home life style want their toys. There needs to be space for 4-wheelers, motorcycles, bicycles, snow machines, personal water craft, etc.

Motor homes today have most of their furniture fixed in one position. This tends to define a given space to one function. People want to be able to arrange their own furniture and have more flexible use of space.

Motor homes are typically poorly insulated. Many won't tolerate the extreme cold of a ski resort without water freezing problems and/or excess heating fuel consumption. They also use a lot of energy staying cool. Often the air conditioning units are roof mounted pods that add to height with out adding space. What is needed is better thermal performance with integral heating and cooling.

Much of the current construction is light assemblies of dissimilar materials mechanically fastened or bonded together. Often, provision for different expansions and performances of different materials is not considered in construction. More durable permanent construction is needed.

Many motor homes are very heavy with large frontal areas and poor aerodynamics. Many carry their weight high making them top heavy. Many are under-powered compared to the traffic around them. Better handling and fuel performance is needed.

The regulatory dimension limits for a motor home in the United States are 8½ feet wide, 13½ feet high, and up to 50 feet long. Most states will allow motor homes of 50 feet in length to be classified as busses, but the trend in motor homes is a 40 foot maximum length. The maximum allowed expanded living space in a motor home by regulation is 400 square feet. Any desired function must be achieved within this finite space.

The great weight associated with class A motor homes interferes with the capacity of the vehicle. One commercially available motor home has a gross vehicle weight of 55,000 lbs, and a wet weight of 54,140 lbs, leaving only 860 lbs of capacity for passengers, luggage, and other equipment. This would be inadequate to hold weighty equipment like automobiles, all terrain vehicles, or snowmobiles. The massiveness of this vehicle substantially retards fuel efficiency as well as capacity.

Clearly what is needed is a Class A recreational vehicle capable of providing high payload capacity, improved fuel efficiency, and ample flexible living space and storage space.

SUMMARY OF THE INVENTION

The invention is directed to improvements in the design, construction and utility of a motor home that meet the present regulatory constraints.

It is therefore an object of the present invention to provide a recreational vehicle with unibody construction each component contributes to the strength and rigidity of the whole.

It is another object of the present invention to provide a recreational vehicle with a resilient bonding method to adhere body components of dissimilar materials together to produce a resilient rigidity.

It is a yet another object of the present invention to provide a recreational vehicle with a fully foam insulated, stress skin panel exterior.

It is a further object of the present invention to provide a recreational vehicle with integral tanks and compartments within the molded body.

It is a still further object of the present invention to provide a recreational vehicle with garage for at least one automobile or other sport or utility vehicle or large device.

It is still another object of the present invention to provide a recreational vehicle having flexible, expandable living space.

Other objects and advantages of the present invention will become readily apparent to those skilled in this art from the following detailed description, wherein we have shown and described only a preferred embodiment of the invention, simply by way of illustration of the best mode contemplated by us on carrying out our invention.

BRIEF DESCRIPTION OF THE DRAWINGS

FIG. 7 is an elevation view illustrating a recreational vehicle in accordance with one embodiment of the present invention in which are stowed three automobiles of varying body types.

FIG. 9 is a cross sectional elevational view illustrating a recreational vehicle in accordance with one embodiment of the present invention in which side wall bump outs are extended.

FIG. 10 is a sequence of detail cross sectional views illustrating the retracted, transitional, and extended positions of the roof of the bump outs of different configurations of a recreational vehicle according to one embodiment of the present invention.

FIG. 11 is a sequence of detail cross sectional views illustrating the operation of a depressible floor of a recreational vehicle in accordance with one embodiment of the present invention.

DETAILED DESCRIPTION OF THE PREFERRED EMBODIMENT

Figure 1:
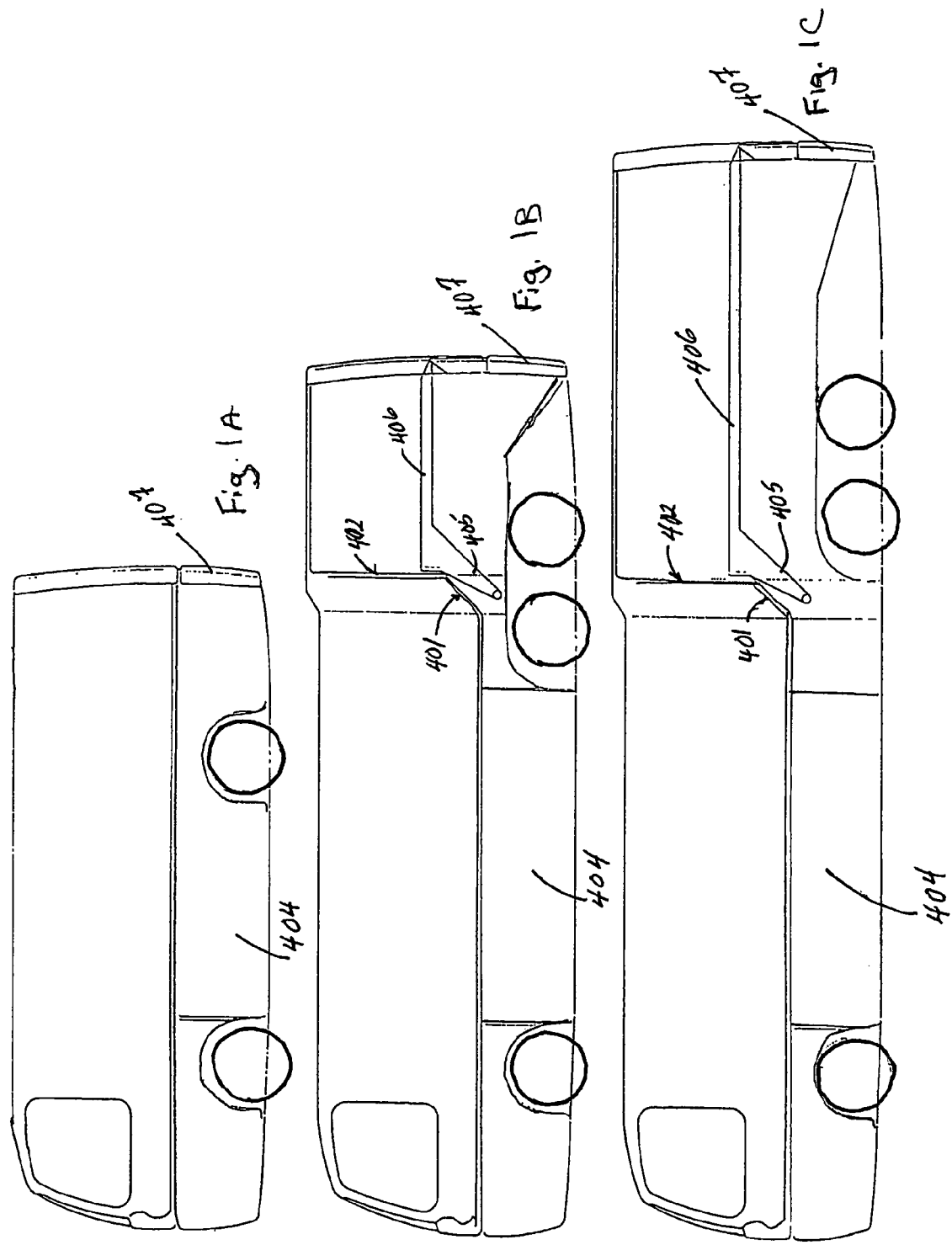
FIG. 1 is a sequence of elevation views illustrating configurations of recreational vehicles from compact to extended sizes, all in accordance with one embodiment of the present invention.

The invention is capable of many embodiments, incorporating all or some of the features described and illustrated in the figures, in any number of similar and equivalent variations. Some of the many features and variations include the following:

A garage. In one embodiment, the storage space is long enough to accommodate very lengthy objects, such as multiple vehicles or even a sailboat. And it is tall enough to accommodate a second floor above the lower floor or basement, for storage of a small automobile. The lower level storage space can be expanded into the upper level volume to create a space of particular desired height.

A driver's station module that is stowable. It drops beneath the floor of the driver's space to add that square footage to the living area.

The windshield and side windows of the drivers compartment may drop into the chassis sidewall to make an open air space of the converted driver's station. A full sunroof at the top of the space slides into the main roof. The glazing may have screens and shades that stow when not deployed.

Vehicle side bump out or slide out sections that almost double the width of the living area and increase the living space to the 400 square feet maximum allowable. The joints between the bump outs and the chassis provide a flat floor and continuous ceiling offering maximum utilization of floor space, height, and total enclosed volume.

The vehicle may be configured with front engine front wheel drive to modularize the drive train and free up additional space in the rear of the vehicle.

A highly developed convertible interior allows multi function areas providing maximum functionality in minimal space.

Integral air scoops or inlets at the rear end in or adjacent the rear hatch have side ducting and rear exhaust for heat exchangers or air conditioning.

The invention applies the unitized construction concept of designing each component, where possible, to contribute to the strength of the whole chassis as well as achieving the desired space, specific function, and reduced weight.

The bond between the automobile glass and frame is a resilient one to allow for the different properties of dissimilar joined materials. Such a bond provides a rigid structure with resilience only sufficient to accommodate the differential expansion of the joined components or the momentary deformation of one of those components. There may be a temperature differential of as much as 100° F. between the inner and outer skins of the vehicle. Therefore, thermal barriers are placed between the glass, the external skin and the internal skin of the vehicle, thereby preventing the transfer of heat between the exterior and interior. The structure is designed to absorb some of the energy of an impact by momentary deflection of the skin and the foam core. Unibody construction is a construction technique in which components are not independently attached to a frame, but to each other, thus defining the frame and allowing all components of the structure to provide support and contribute to the structural integrity of the whole.

The unibody construction of the motor home is achieved by joining fewer, larger, more homogeneous, components together. Larger sections of dissimilar materials require more resilient bonds. Some components are bonded with a resilient tape or adhesive like that used to bond automobile glass. Others are foam bonded with a special dense, resilient, adhesive, plastic foam to produce a unique "resilient rigidity" The unique foam bonding greatly improves fit, ease of assembly, and thermal properties.

A panel is placed next to a joining member or part. It may be clamped or mechanically fastened to hold its position. A void is left between the joining components. That void is then filled with foam. The fit, insulation, and resilient bond is complete with the curve of the foam.

The floor has a ribbed core with minimal use of foam. The voids between the upper and lower skins of the floor comprising the enclosed volume are divided into cells used as tanks to store the fluids needed by the unit. The bottom skin of the floor panel is arched both laterally and longitudinally so as to be higher in the center with respect to the four corners. This provides four convenient points of drainage, one in each corner of the overall structure. Where the space is divided into four quadrants or tanks, each extending to a respective corner, this provides a natural point of drainage from each tank, and better overall torsional structural stiffness to the floor. Additional stiffening ribs within the structure may have slotted top and bottom flanges to allow fluid to pass through. They serve as baffles to control liquid motion in each tank while the vehicle is in transit.

The floor of an embodiment extends from the front to the center of the rear wheels where it transitions vertically for about three feet at a 45-degree angle and then to a vertical diaphragm of the unibody. Such a transition conforms to the contours of a vehicle stored in the garage thereby maximizing garage space and living space.

The roof may be made from at least one ribbed foam core stress skinned panel. There are two large ducts that run the length of the roof through the foam and trusses to serve as air handling ducts. There are also smaller tubes running the length for utility conduit. As an option the roof surface can be done in solar panels which in good sun can provide most of the energy needs of the well insulated unit.

The side walls of the unit between the floor and roof are open for more than half their length to accommodate the bump outs that extend from the sides. The sides of the unit fore and aft the openings are foam core panel components of the unibody The use of stressed skin foam core panels in a unibody construction produces a substantially lighter vehicle. As a result, the vehicle would achieve substantially improved fuel efficiency, and substantially augmented payload capacity. In accordance with the invention, the wet weight can be reduced to much less than 80% of the gross vehicle weigh rating; even as little as about 65%. In one embodiment the vehicle has a gross vehicle weight rating of about approximately 30,000 lbs. The estimated wet weight of the vehicle is about approximately 20,000 lbs. Therefore, in this embodiment, a full 10,000 lbs is available for passengers, and the storage of automobiles, all terrain vehicles, luggage, etc.

The bumper wraps around the entire perimeter of the bottom of the vehicle. The bumper consists of molded flexible plastic cover sections that are foam bonded to a frame or ridged body panel. The doors of the basement space are of the same construction as the rest of the bumper surfaces. The foam bonding makes tooling and assembly of these parts very simple and economic.

The chassis can be easily modified during assembly to accommodate a variety of applications. As illustrated in FIGS. 1a–1c, a variety of models may be made using the basic plane of the vehicle according to one embodiment of the present invention. This can be achieved by blocking the molds of the horizontal and vertical panels.

The automobile industry has gone from a power train that extends most of the length of the vehicle to a front wheel drive engine/trans-axle module. Front drives are not unique to the R/V (recreational vehicle) industry. They are unique to a six wheel, air suspension, air disk braked class A motor home. The front suspension of an embodiment carries the steering, suspension, trans-axle, and engine. The chassis between the front wheel wells integrates two frame rails that extend to the front of the vehicle. These rails carry the engine and the floor panel.

According to one embodiment, illustrated in FIGS. 1a–1c, the basement or lower level storage space starts behind the front wheels and extends to the rear of the vehicle, a total length of about 30 feet. The basement 404 is integrated into the garage allowing ease of access. It is 8 feet wide except between the wheel wells where it reduces to about 6 feet wide. It is up to about approximately 4 feet high beneath the floor then rises at a 45 degree angle 401 for about approximately 2 feet, then goes vertical 402 to a 12 foot inside height for the remainder of the length of the vehicle. This area will accommodate most cars and some SUVs (sport utility vehicles). The area described is that of one embodiment. It can be tailored to other size applications in design and manufacturing stages.

Figure 2:
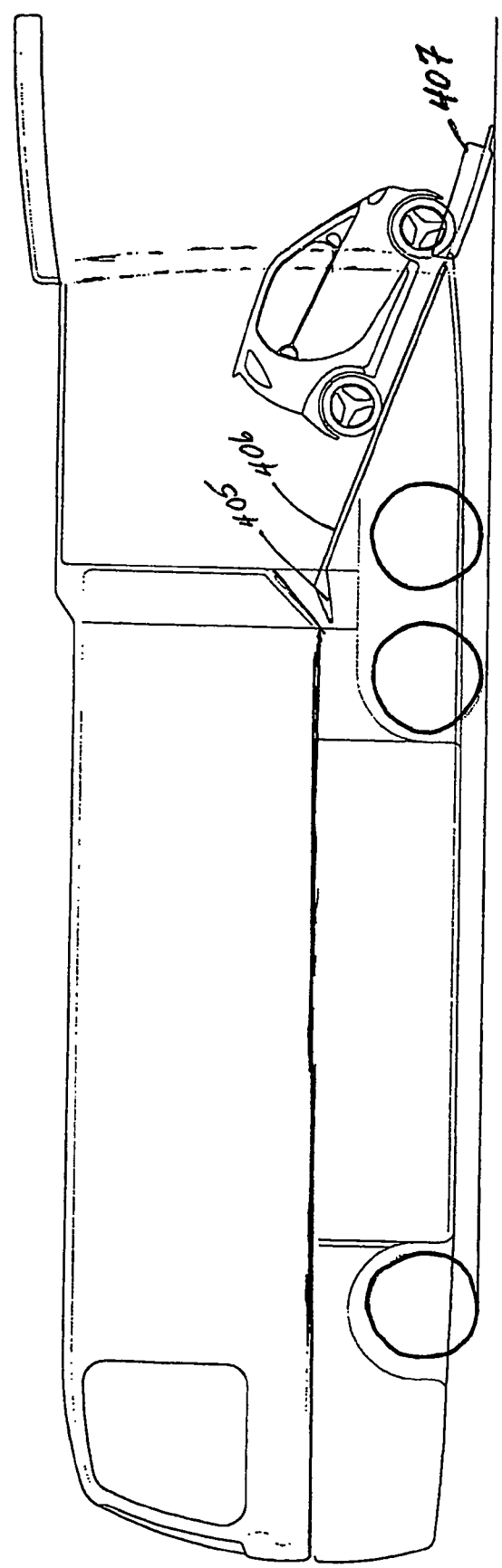
FIG. 2 is an elevation view illustrating a recreational vehicle in accordance with one embodiment of the present invention wherein a vehicle stowed in an upper garage is being deployed.
Figure 3:
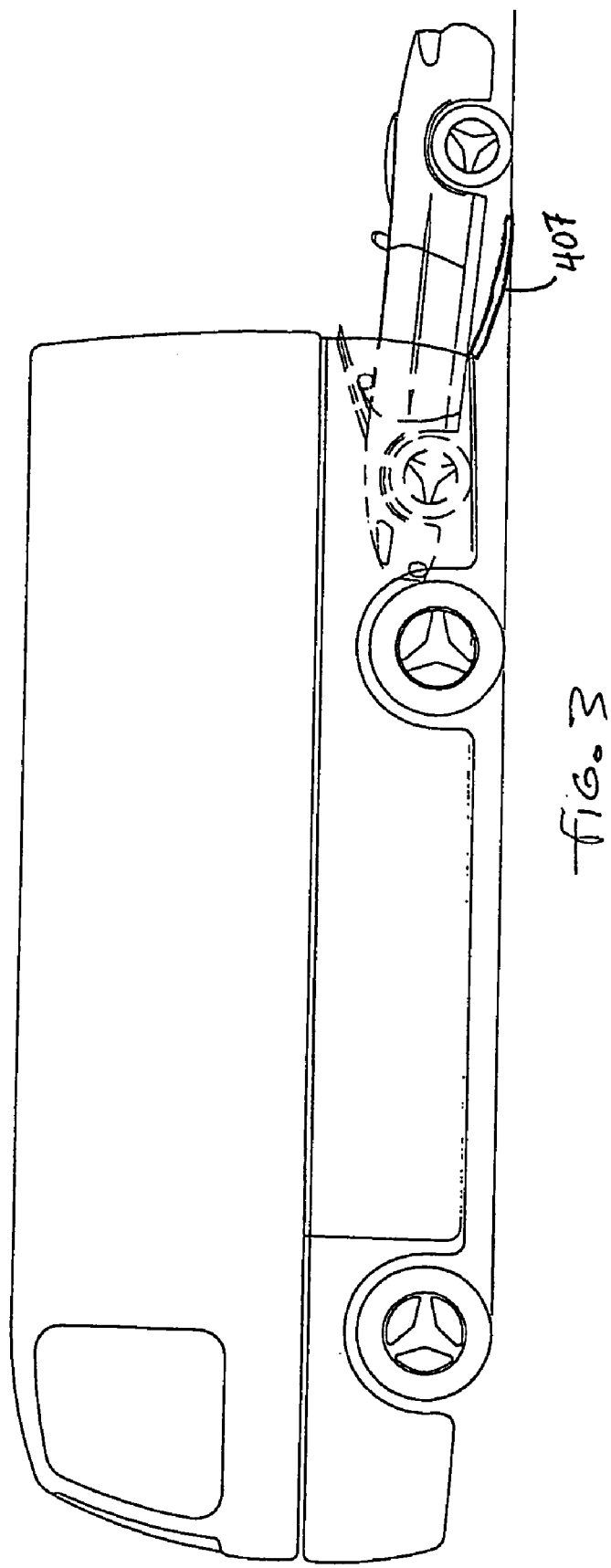
FIG. 3 is an elevation view illustrating a compact recreational vehicle in accordance with one embodiment of the present invention wherein an automobile is being loaded into the basement-garage of the vehicle.

In one embodiment, an automobile is pulled into the garage, without driver, front first with a chain drag built into the floor or by other suitable mechanism. The chain drag also pushes the automobile back out on demand. Alternatively, some cars may be sufficiently compact that in some embodiments no chain drive system is necessary, and a driver may just drive the car on board and with room to exit the garage. Alternatively, a rolling or sliding tray or carriage upon which the car is placed may be used to insert or remove the automobile from the garage. Other means of parking the car would be readily apparent to one of ordinary skill in the art. The nose of the automobile goes into the lower, about approximately 4 feet high space, the windshield is accommodated under the 45 degree ceiling and the roof of the automobile by the higher space. Above the automobile in the 12 feet high garage space, a second floor 406 can be placed, hinged at the front 405 below the floor level so it moves back as it rotates down for vehicle loading and unloading. As illustrated in FIG. 2, once the lower level space is vacated, the second floor can be dropped so that its back edge contacts the back of the bottom or floor level of the motor home.

Referring again to FIGS. 1a–3, The space between the wheel wells is just over six feet wide but the second floor is almost 8 feet wide and can accommodate a full width load or vehicle, or more two narrower objects such as all terrain vehicles or snowmobiles. The second floor 406 is raised and lowered with hydraulics permitting the introduction of these additional vehicles. At the back edge of the bottom floor is a ramp 407 that stows and travels in a vertical position and folds down to access both floors from the street level when loading and unloading vehicles. The back edge of the ramp in its folded position engages the back edge of the upper floor to give it rigid support in transit. The top floor may have a winch that adjusts side to side to pull left and right side vehicles onboard.

As stated, the top floor of this two level garage space will accommodate the snow machines, 4-wheelers, jet skies, etc. essential to a motor home life style. The applications of the combined space are only limited by the imagination. This concept, as illustrated in FIGS. 2 and 7, is used in car carriers but is unique in motor homes.

Figure 4:
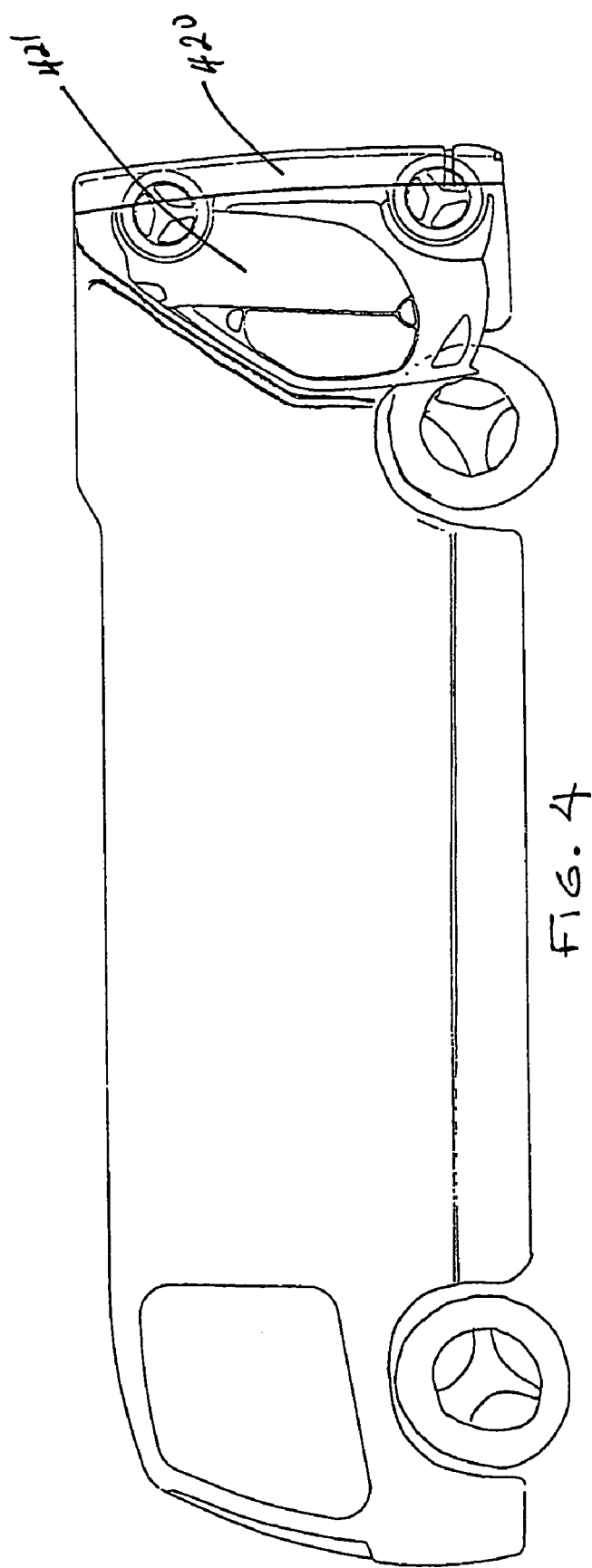
FIG. 4 is an elevation view illustrating a compact car stowed in a vertical position in the rear of a recreational vehicle in accordance with one embodiment of the present invention.
Figure 5:
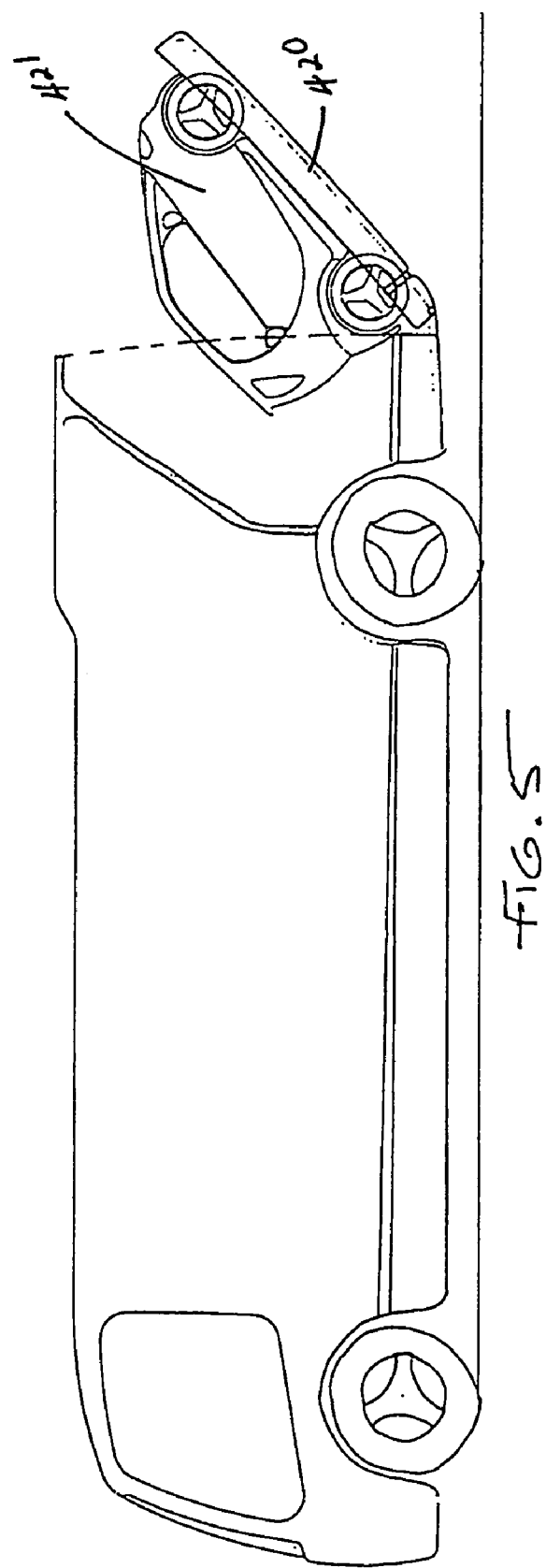
FIG. 5 is an elevation view illustrating a compact car being deployed from the vertical position by a recreational vehicle in accordance with one embodiment of the present invention.

Another automobile storage mode, illustrated in FIGS. 4 and 5 is to stow the automobile vertically. The rear gate of the vehicle 420 may be a full height, full width back wall to the motor home, which doubles as a ramp that is hinged at the floor bottom and folds to the ground. The automobile 421 is driven onto it, fastened in place both front and rear, and lifted into a vertical position as the ramp 420 is raised and closed in its travel position. This mode of automobile storage consumes only 4–5 feet of overall length at the rear of the motor home. It can be implemented with motor homes configured with either a rear differential or rear engine that might otherwise preclude a rear loading automobile storage space. Its principle limitation is the length of the automobile that can be stored in this way. The automobile cannot exceed 12 feet in length. Daimler-Chrysler is about to introduce the 8 foot long "Smart" car and the 10 foot long "A-Class" car to the U.S. market. These and similar existing and future small vehicle designs make this feature very feasible.

The third method of storage puts the car in the basement of this bi-level motor home, illustrated in FIGS. 2 and 7. As described above, the basement space is accessed from the rear with a gate that folds down to become a ramp. In one embodiment, a drag mechanism or sliding tray is used to pull the automobile into the basement, as the width precludes opening side doors on the stowed automobile. This automobile storage system allows a full 400 square feet of living space when incorporating the side panel bump outs and component chassis system described herein. The system will allow a basement height of up to about 4.5 feet. This will accommodate many low automobiles less than 4.5 feet high and less than 6 feet 2 inches wide. With the aft end of the garage space configured in such a bi-level configuration the vehicle can accept up to three vehicles, two stored on the lower level, one stowed in the upper level.

Figure 8:
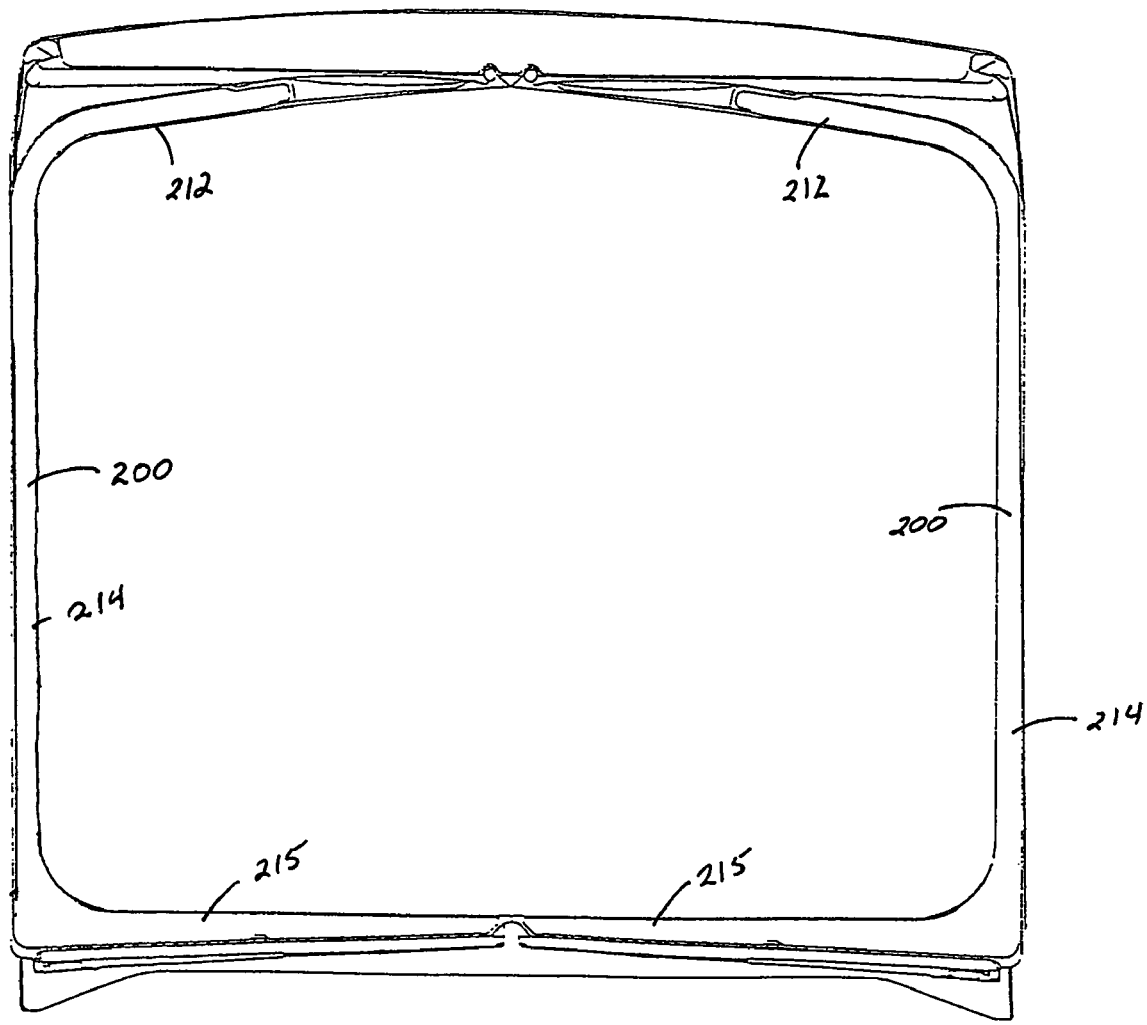
FIG. 8 is a cross sectional elevational view illustrating a recreational vehicle in accordance with one embodiment of the present invention in which side wall bump outs are retracted.
Figure 12A:
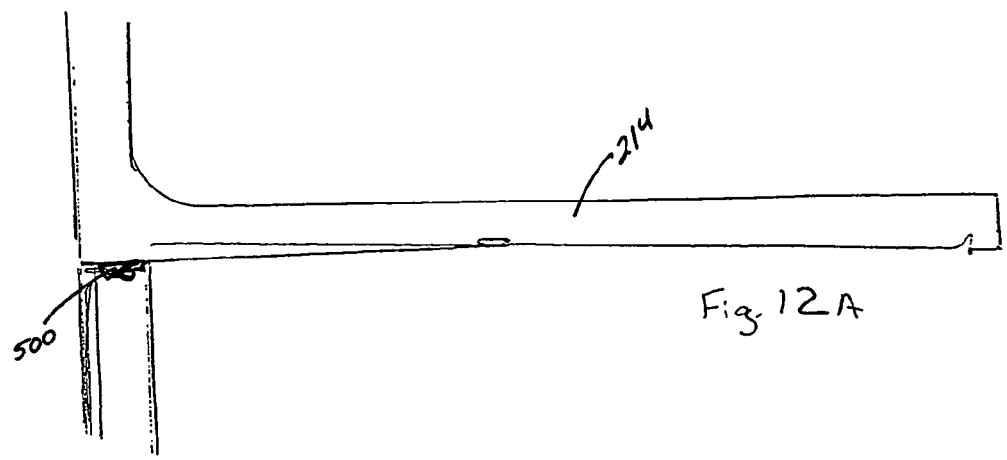
FIG. 12 is a sequence of cross sectional plan views illustrating the operation of the bump out locking mechanism of a recreational vehicle in accordance with one embodiment of the present invention.
Figure 12B:
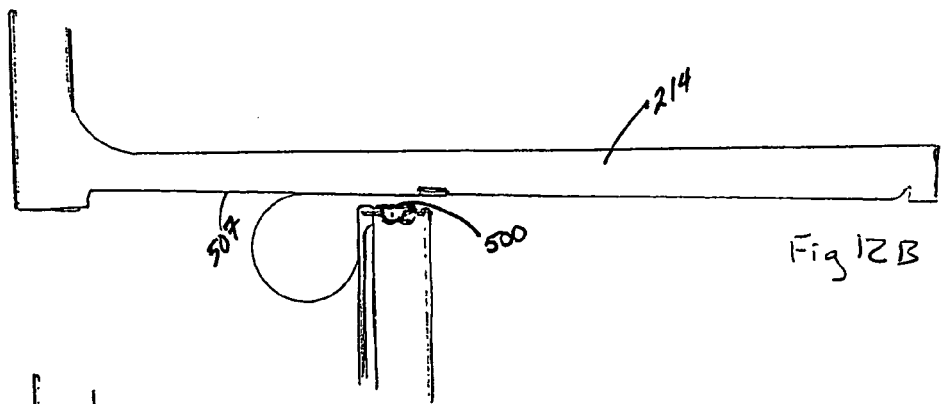
Figure 12C:
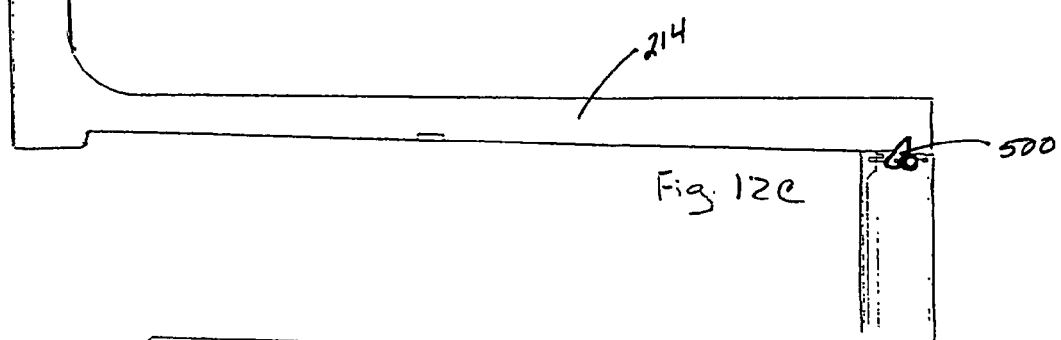
Figures 12D, 12E:
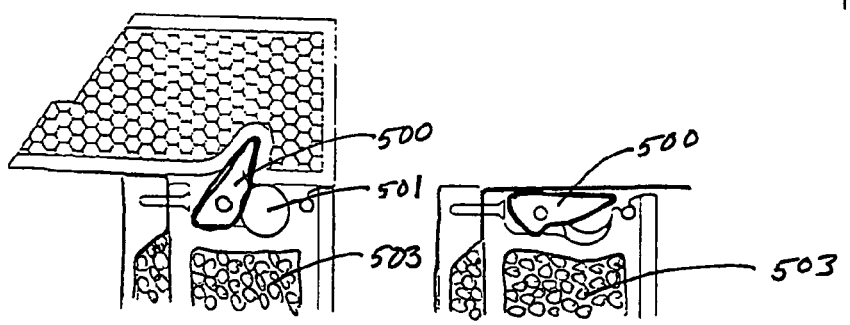

In one embodiment of the present invention, as illustrated in FIG. 8, the side panel bump outs 200 of an embodiment almost touch in the middle of the motor home when the bump out 200 are retracted. According to one embodiment of the present invention, at least one bump out 200 may be configured to allow a means of entrance and egress to the bump outs through an entranceway from the driver's compartment when both bump outs 200 are fully retracted. By utilizing the full width of the vehicle 100 for retracting the bump outs 200, the bump outs 200 can be of maximum width and the resulting extensions can be of maximum depth. In one embodiment, two bump outs are located across from each other. The floors of the bump outs stay in a common plane, no matter whether the bump out are retracted, in transition, or extended. When fully extended, the floors of the bump outs 200 are flush with the floor of the cabin 204; when fully retracted the floors of the bump outs 200 are flush with each other. In both positions, no step is present whereby an occupant may be tripped. The bump outs 200 may be extended independently of each other. As can be readily appreciated from FIG. 9, the bump outs 200 according to one embodiment are designed to provide full headroom, though somewhat less than that offered by the main cabin. This maximizes the useable space, and increases flexibility while retaining an inclined roof for watershed.

The preferred embodiment motor home in accordance with the invention has a continuous arched ceiling 208 with only a minimal seam at the transition between the main ceiling and that of the bump out section on either side of the chassis 100 when the bump out is extended.

In one embodiment, the roof 212, walls 214, and floor 215 of the bump out 200 are composed of stress skin panels, with molded interior shells bonded to foam cores. The panels configured to allow a high degree of insulation; a 3-inch thick composite wall panel according to one embodiment of the present invention, has an R value of about approximately 16. The roof 212 of the bump out is configured to be depressible, thereby facilitating the extension and retraction of the bump out 200. This depressability can be achieved through the use of either hinged segments or, as illustrated in FIGS. 10a–10c, a vacuum actuated flexible member 216.

Referring now to FIGS. 10a–10c, in one embodiment, a tent, skirt or similar structure 218, composed of resilient flexible material, is fixed, on one side, to the perimeter of the opening in the body of the vehicle 100 and, on the other, the perimeter of the bump out 200, in such a way as to prevent the admission of insects, dust, pollen, spoors, and debris as well as to weatherproof the cabin during the transition between the expanded and traveling positions, and vies versa. The skirt 218 also performs other beneficial functions. For instance, at the junction between the roof of the vehicle 100 and the roof of the bump out 200 is disposed a flap or wing 220 hingedly mounted on the edge of the roof of the cabin and that overlaps the joint. This flap 220 strengthens the joint, maintains the aesthetically pleasing contour of the vehicle, and provides an additional, overlapping layer of foam insulation. In one embodiment it contributes to the support of the fully extended bump out 200, by locking it in place. When the bump out 200 is retracted, this flap 220 falls along the outside of the bump out 200. The skirt 218, which is connected to the flap 220, is under tension when the bump out 200 is retracted. The tension of the skirt 218 keeps the flap 220 securely against the side of the bump out 200. When the bump out 200 is being extended or retracted the cabin is temporarily pressurized at a pressure slightly in excess of ambient. The skirt 218 is then slightly inflated, lifting the flap 220 and preventing the flap 220 from rubbing on the skirt 218 or the bump out 200 itself. Once extended, the skirt 218 again becomes tight, aligning the flap 220 with the roof 212 of the extended bump out 200 and assuring proper alignment of a roller latch 230. The roller latch 230, attached to the inboard end of the bump out roof 212, may then engage with the flap 220, locking both securely in place.

An alternative roof profile can be provided by foregoing the use of flaps 220 and configuring the flexible roof of the bump outs substantially in the way illustrated in FIG. 10d–10e. In this embodiment, an additional skin 400 is provided, which is deformed by manipulation of pneumatic pressure.

In an alternative embodiment, in the retracted position, the bump outs rise over the floor of the main vehicle. When extended, the bump out 200 rides on a mechanism that provides for a modest step down of the bump out 200 at the fully extended position, which sets the bump out floor 214 flush with the main section floor 204 and locks the bump out 200 into position. This system requires the inner edge of the bump out roof 212 to rise to intersect the edge of the main roof. This is done by hinging the last foot or so of the bump out roof 216. At the end of the outward movement as the bump out 200 drops, the hinged roof edge 216 rises to meet the main roof.

In one embodiment illustrated in FIGS. 10a–10c, the flexible roof member is a vacuum actuated flexible member 216, the depressible portion of the roof has top 222 and bottom skins 224 that are substantially deformable, but are resistant to external deflection forces. In one embodiment, the top skin 222 is formed in a convex configuration. Bottom skin 224 is formed in a flat configuration. As a vacuum is induced in the interstitial cavity formed by the skins, the convex segment skins are deflected inwards. The interstitial cavity may be filled with compressible 226 and non-compressible foam 228 thereby controlling the flex of the member 216. The convex top skin 222 becomes more flat, the flat bottom skin 224 becomes more concave, thus distal edge of member 216 itself is deflected downward. There can be a plurality of such actuator chambers.

At the extremity of the member 216, a series of rollers or wheels 230 is disposed. These rollers roll may be a primary or secondary system for actuating the flexible roof by following the contour of the ceiling of the cabin when the bump out is in transition. When the bump out is fully extended, the rollers engage in a corresponding channel. The deflection of the member permits the rollers to be disengaged from the cavity, facilitating the transition of the bump out 200 between extended and retracted modes. This deflection can be achieved by the vacuum method or the roller method, or a combination of the two. In one embodiment, the rollers serve as an auxiliary method of deflection in case the pneumatic system fails.

Such a pneumatically or hydraulically actuated deformable mechanism may be useful in a number of other applications, particularly fluid flow control mechanisms, such as trailing edge trim flaps of airplanes, submarines, and hydrofoils, rudders, mixing valves, and closing valves. It may also be useful as a means of locomotion in such a fluid medium.

According to one embodiment of the present invention, the hinge is a "living hinge" 216 with a continuous membrane flexible hinge line. The section of the bump out roof from where it joins the main roof to about one half the sloped length is a single layer of fiber-reinforced plastic with a hook on the trailing or joining end. That plastic sheet will flex and has a memory. As the bump out moves outward from the main chassis, the flexible roof edge rides against the edge of the arched main ceiling, causing it to flex downward. At the end of its travel, the bump out drops into position. At the same time, the flexible roof edge pushes its hooked end up into the interlocking edge of the main roof. In this position the bump out roof is under tension which helps keep the bump out straight and the joint tight. When the bump out is retracted, its inward movement forces the hook out of the interlock, and the bump out roof edge follows the main ceiling profile to where it nests for travel.

In one embodiment, as illustrated in FIGS. 11a–11g, the skirt 218 continued around the circumference of the bump out 200, even under the floor of the bump out 215. In FIG. 11a is shown the retracted position of the bump outs 200. The floors 215 of the bump outs 200 may meet in the middle of the cabin. The inboard edges of the floors 215 are angled to help guide the floor panel into position. In transition, as illustrated in FIG. 11b, the skirt 218 is inflated with cabin pressure against the chassis and the bottom of the bump out to avoid and abrasion, because of the parallel angle surfaces of the floor panel and the bump out. The skirt space grows as the bump out moves. As illustrated in FIG. 11c the bump out is fully extended, the floor panels 204 rise into position. In one embodiment, as illustrated in FIGS. 11a–11g, the bump out floor may stay in a single plane, before, during and after deployment. As illustrated in FIG. 11d, the center section of the floor of the vehicle body may include two moveable sections or panels 204, one on either side of the center of the vehicle. When the bump outs are in their extended position, the panels are raised to an upright position flush with the floor of the bump outs, one edge resting on a lip 301 on the inboard side of the bump out, the other resting on a center support structure 302, beneath the center panels is a central support floor 303. The support floor 303 is angled, having a raised center section in the center, upon which the central support structure 302 is disposed. The support floor's 303 shape enables it to have the strength of a truss, minimizing the space required for supporting the weight of the floor, furnishings and inhabitants as well as some of the weight of the retracted bump outs 200. As is shown in FIGS. 11a–11g an actuation means 304, such as pneumatic controlled air bags are configured to raise the panels into position when the bump outs are extended, and to lower the panels beneath the floor of the bump out. In this stowed position, the floor panel 204 is parallel to the sloped top surface of the support floor 303.

Referring again to FIG. 9, in one embodiment the floor panels 204 are configured to rise from the chassis 100, thereby engaging bump out floor 215, locking the bump out 200 in position and providing a flat floor. The inner edge of the bump out roof 216 rises to engage the main roof latching and thereby producing a smooth transition.

In one embodiment, the bump out is carried on its four inside corners which are moved synchronously. This can be achieve using a number of commercially available components, such as rollers, linear bearings, pinions, ball screws, chains timing gears and similar well know elements. By actuating the bump outs 200 by four independent synchronous drive mechanisms; the drive mechanisms can be small enough to be concealed in the floor and ceilings. As the mechanisms are located at the four corners, the bump out is suspended and does not come into contact with and therefore does not abrade any finished surfaces or the skirt. When the bump out 200 is fully extended, the floor panels 204 of the cabin 100 are raised using inflated pneumatic bags 304 disposed beneath the floor panel. Another pneumatic bag is then inflated, and the outboard side of the floor is raised by a bar or support 311 running the length of the bump out 200 and actuated by this second pneumatic bag. This support 311 supports both the floor 204, and the extended bump outs 200. The support also seals the chamber below the floor when not in transition, thereby preventing the accumulation of waste, liquid, and debris.

An embodiment of the present invention provides for maintenance of any sub-floor systems and the removal of debris, waste or dirt that may accumulate below the floor panels. A third pneumatic bag 312 connected to the chassis 303, the floor panel 204, and an elastic strap 313. The strap controls the range of movement of the floor panel, and stretched the deflated third pneumatic bag 312 over the first pneumatic bag 304. During normal operation the third pneumatic bag 312 remains deflated, and displacement is achieved by inflating the first pneumatic bladder 304. This provides a limited access for cleaning and maintenance to the inboard side of the sub floor cavity. For access to the outboard side of the sub-floor cavity, the third bladder is inflated, rotating the plane of the floor panel inward. To stow the panel, the pneumatic bags are evacuated.

Figure 6A:
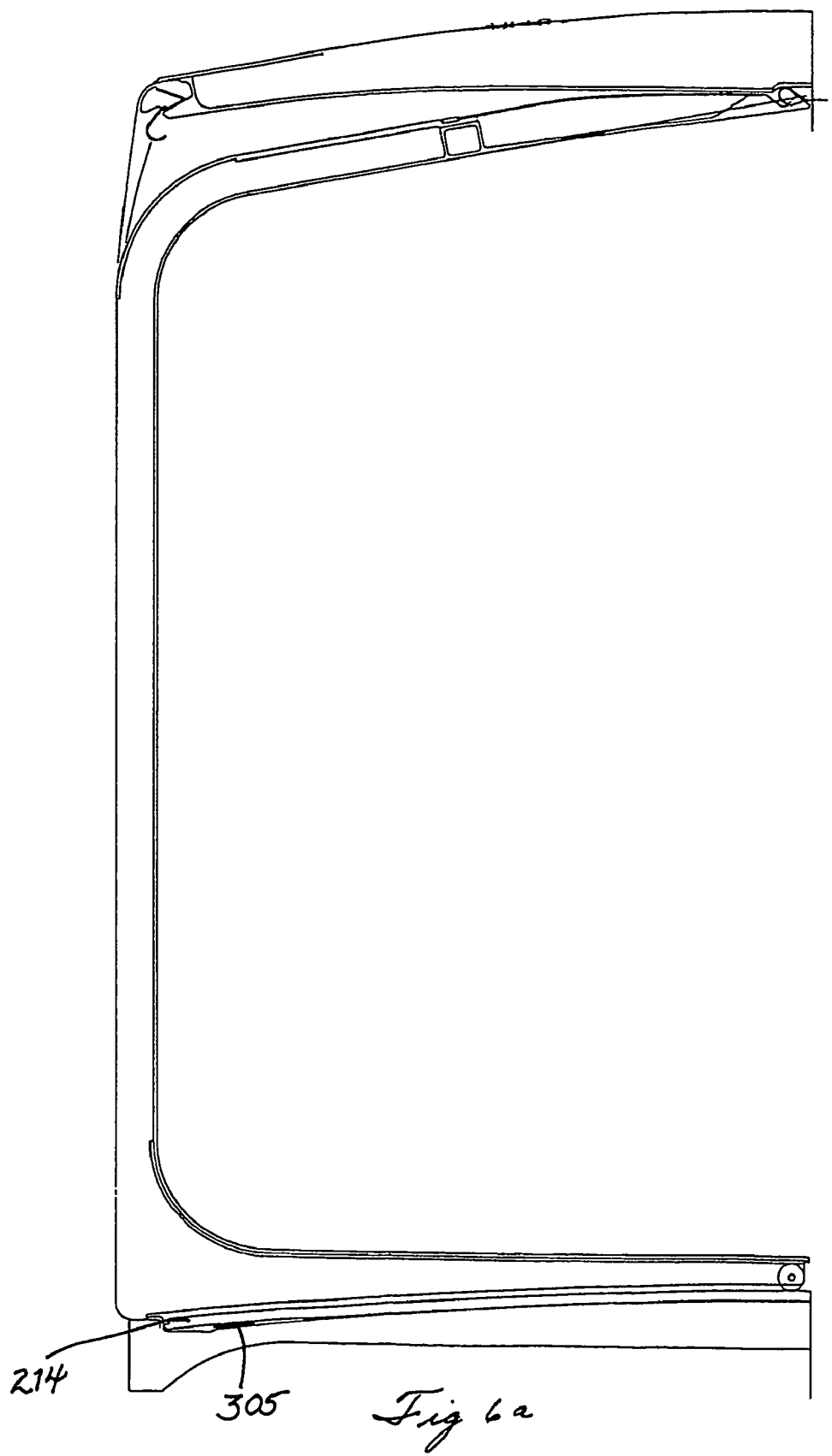
FIG. 6 is a sequence of detail elevational views illustrating a flexible floor bump out retraction mechanism of a recreational vehicle in accordance with one embodiment of the present invention.
Figure 6B:
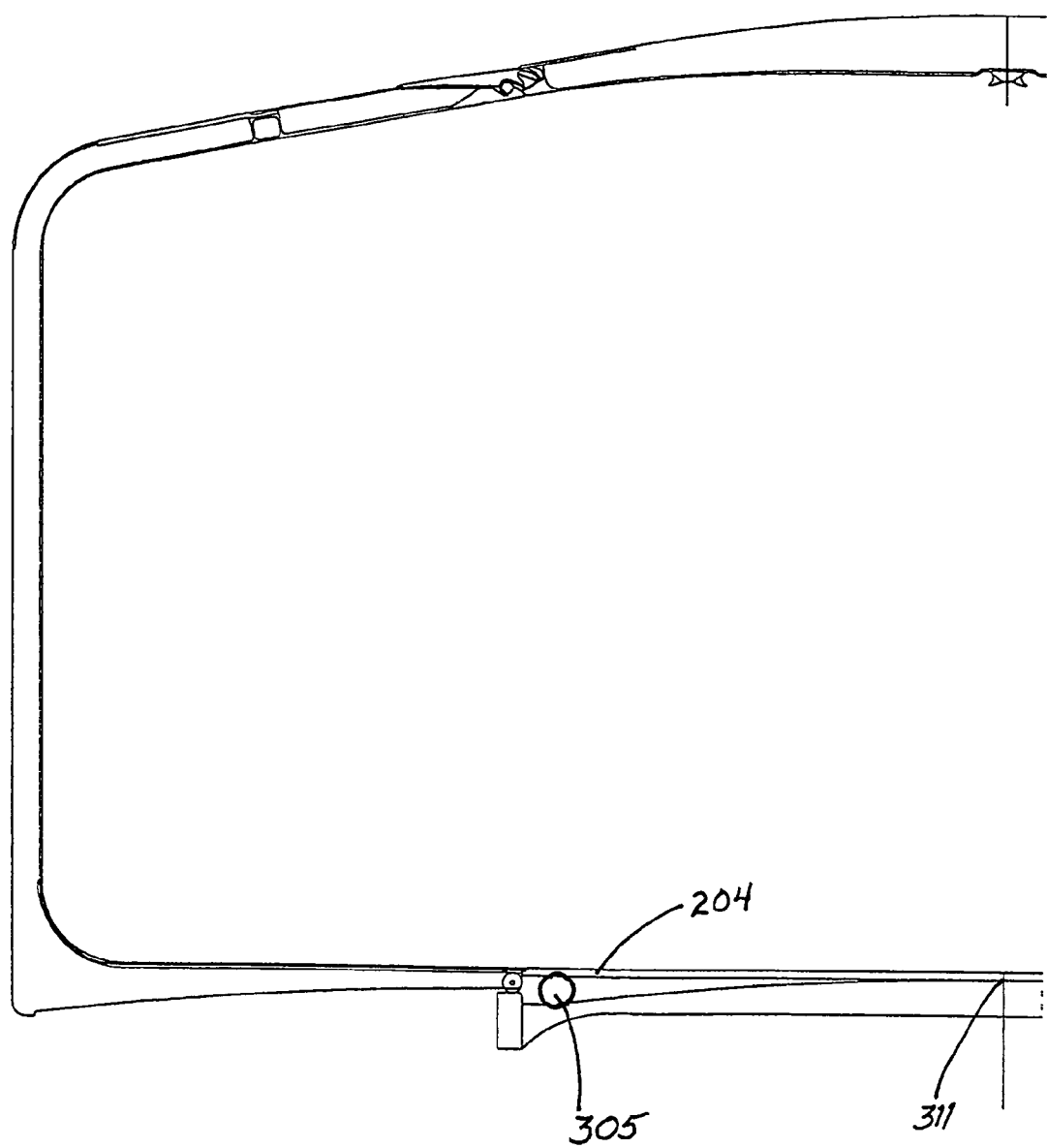

According to one embodiment of the present invention, as illustrated in FIG. 6, the floor 204 of the cabin can be comprised of flexible material and fixed to a central support structure 311 such that when support is removed from its extremities, the floor sags or droops allowing the floor of the bump out to slide on top of it. Temporary support may be provided by an actuating means 305, such as a pneumatic bladder, screw jack, servo, routable support member or hinged support member.

In such an embodiment, wherein the floor may be lowered, the ceiling of the bump out need not necessarily be flexible, since the lowered floor would provide sufficient clearance for the bump out to be retracted and extended.

In one embodiment, illustrated in FIGS. 12a–12g, the sidewall 214 of the bump out 200 is configured in such a way that the skirt 218 may be positioned flat against the side 214 of the extended bump out 200. In this embodiment a latch 500 secures the bump out in its extended position. The latch is disposed in a chassis post 503, and is displaced by an actuating means 501 such as a pneumatic bladder, spring screw or servo. The latch catches in a recess in the sidewall 214 of the bump out 200.

In this embodiment, when the bump out starts to retract, the latch 500 is retracted by evacuating the pneumatic bladder 501. As illustrated in FIG. 5b, when in the bump out 200 is in transition, the skirt 218 is inflated against the exterior skin 507 of the bump out wall 214 and the chassis 100, thereby providing a smooth transition and inhibiting abrasion of the skirt. The bump out side 214 is tapered to allow ample space for the skirt transition. When the bump out 200 is retracted the taper assures that the skirt is isolated from all surfaces along its span. The skirt 218 is attached to the bump out by capturing it between a recess 505 in the bump out wall 214 and a mechanical fastener 509, such as a clamp or strip that is screwed, nailed, riveted or otherwise fixed in that recess over the skirt 218. The skirt 218 is attached to the chassis by capturing it between the exterior skin 507 of the chassis 100 and the chassis post 503.

Figure 13:
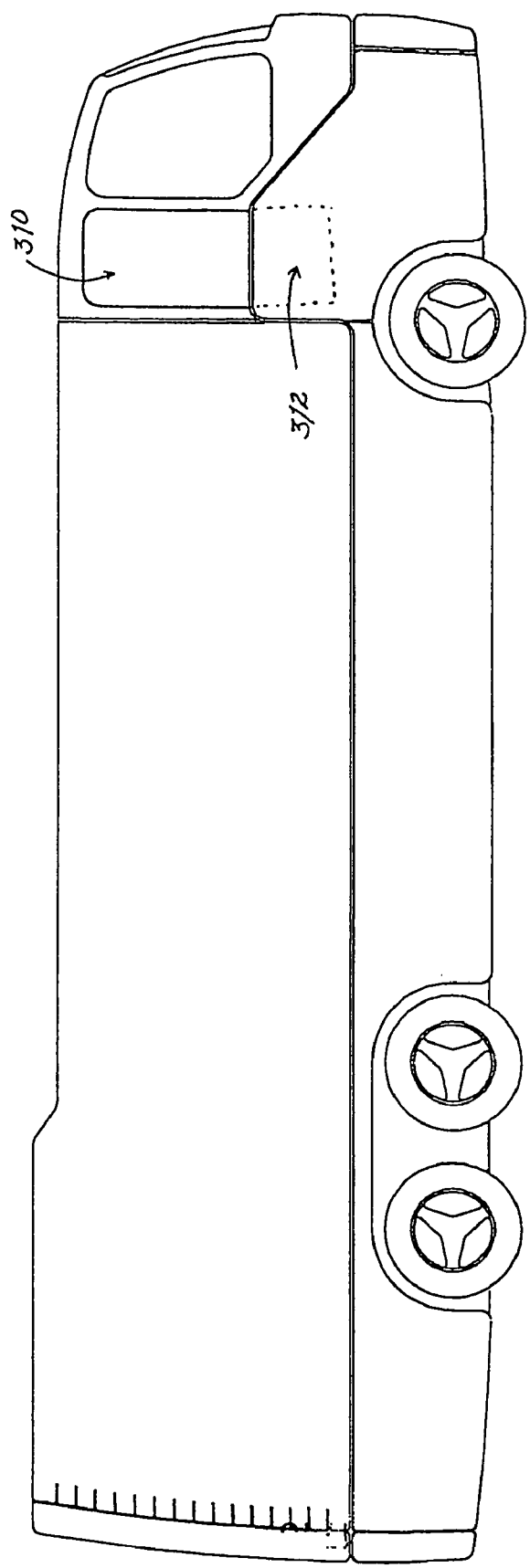
FIG. 13 is an elevational view illustrating a recreational vehicle in accordance with one embodiment of the present invention having a side entrance door with retractable external staircase.

In one embodiment illustrated in FIG. 13, the entryway 310 into the passenger cabin is located approximately above the right front wheel well. As this door 310 is located substantially higher than the level of the ground, a staircase 312 is provided. This staircase 312 runs along the outside of the vehicle, with the outboard side providing a handrail for those exiting or entering the vehicle. When the stair 312 is not needed, it can be folded up into a recess in the side panel of the vehicle. This retractable external staircase configuration allows the passenger cabin to be used in a more flexible, open way, unobstructed by stairs. When the stair is retracted, the banister is flush with the side of the vehicle, but prevents the door from opening out as a means of non-emergency egress. The door may, however, be configured with a window or a "Dutch door" in which the top half of the door is independently deployable from the bottom. Such a window or door would not be entirely blocked by the banister, which would form a parapet to keep children or animals from wandering off or falling out of the vehicle.

Figure 14B:
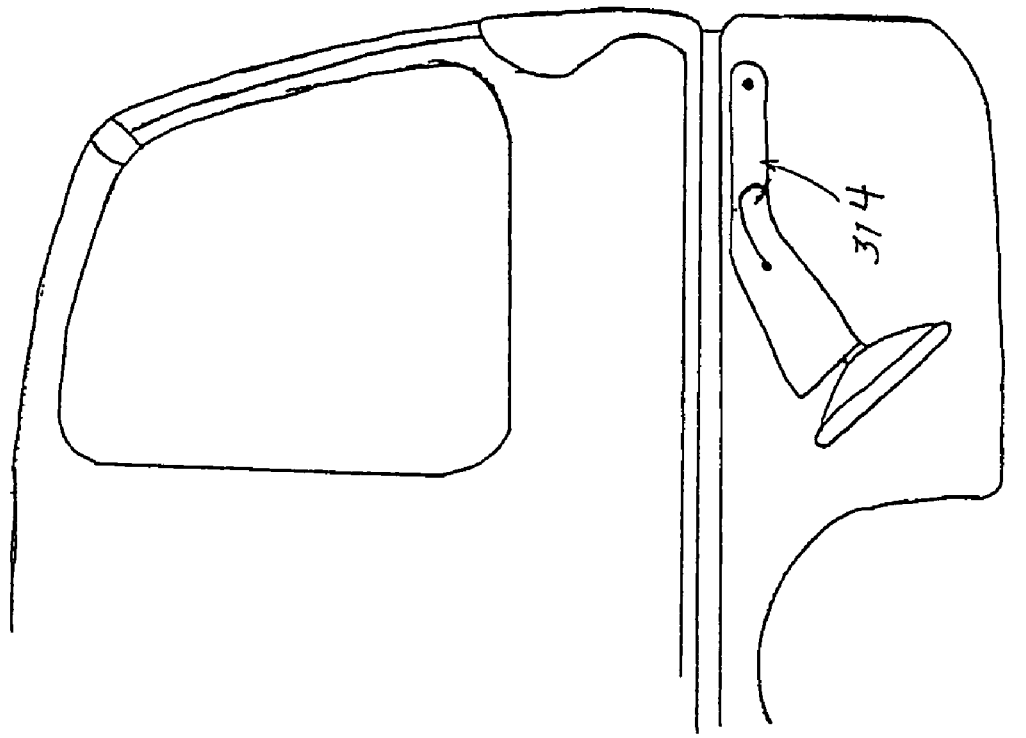
FIG. 14 is a sequence of elevational detail views illustrating a stowable driver console of a recreational vehicle in accordance with one embodiment of the present invention.
Figure 14A:
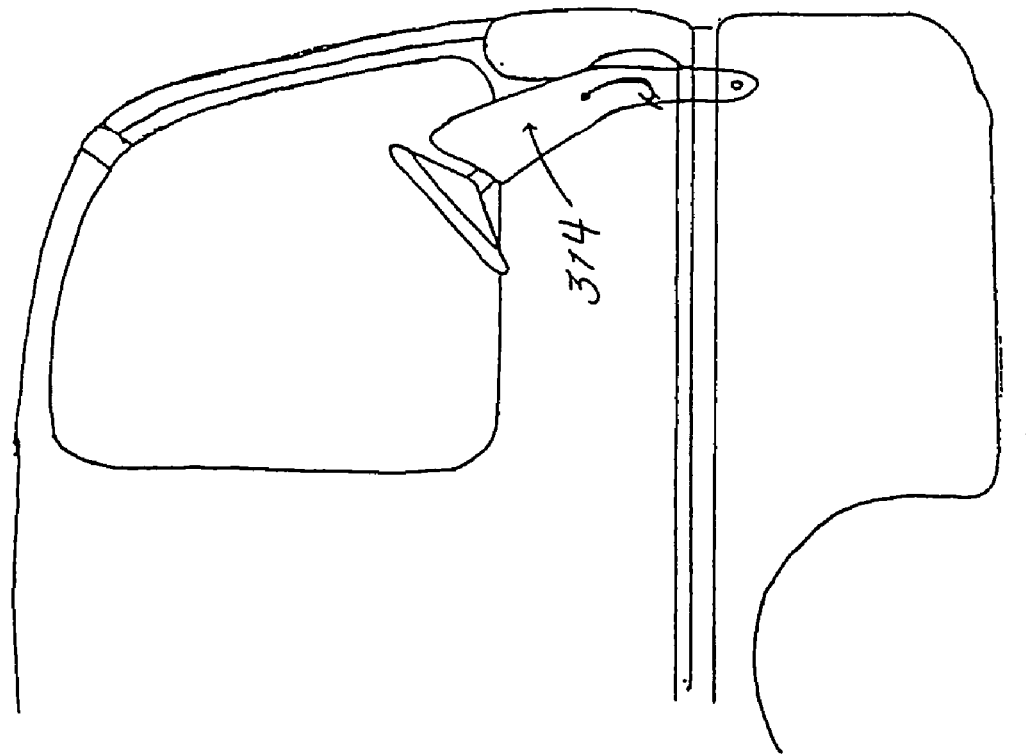

As illustrated in FIGS. 14a and 14b, which are detail cross sections of the cab of a recreational vehicle according to the present invention, to increase the space available when the vehicle is not being driven, the instrument panel 314 is configured to allow it to be folded down from the upright position seen in FIG. 14a to the collapsed position shown in FIG. 14b.

With all of the operating equipment out of the way, the driver's space becomes a multi function living space. The windshield and the side windows may be configured to be received into the chassis below. Each window has a built in screen and shade that also lowers into the chassis below. The roof above that space is a full width glass sunroof that deploys back into the main roof. It too has its own shade and screen. This option makes the driver's station space a spa, porch, screened porch, or sleeping porch. The windows may be mounted in such a way as to thermally insulate the exterior and interior skins of the vehicle from each other. The windows are mounted on thermal barriers, which are composed of thermally non-conductive material, and are disposed between the two skins around the circumference of the window opening. The barrier acts to weatherproof the window and as a thermal gap, preventing the transfer of heat between the skins.

The side windows of the bump out may curve from the vertical of the sides to the slope of the roof. They are hinged on the roof and open by swinging up vertically. They have the same type of screen and shade combination as the front windows. In one embodiment these windows are three to four feet wide and rise about approximately four feet on the wall and about approximately two more feet into the roof. They provide natural light and create a feeling of great space.

In one embodiment, the entire rear panel from the top of the rear bumper to the top of the unit is an opening hatch that is hinged at the top. A radiator and duct system is integrated into the upper portion of the hatch for the air conditioner. The upper portion of the sides at the rear taper in toward the rear towards a vertical air scoop molded into the sides of the body. The scoops pull air in at the side and exhaust it out through the radiator in the hatch. In this embodiment, the air scoops provide post like structures that are integral to the structure of the vehicle. These scopes communicate with the tailgate and funnel air through a radiator located in the tailgate.

One embodiment has the full allowed 400 square feet of living space, under the present standards, but should those standards change, the construction methods described herein would be readily adaptable by one skilled in the art. It also has another 320 square feet of garage and storage space. The cubic volume of the living space is greater than that of the garage storage space because it has more uniform height.

In one embodiment of the present invention, there is a full sized, whirlpool bath in the right front corner of the driver's compartment. The tub moves out toward the center of the space so that a cover can be deployed from a magazine in the space under the floor. The tub then moves back into position under the ridged cover. The cover becomes an elevated platform for the passengers in transit or a seat with the addition of cushions. The tub can be moved out again, the cover retracts, and a folded queen sized bed deploys from the magazine to replace the cover. The tub then moves back into place under the bed. The bed protrudes at a 45° angle into the space providing good access to each side.

It would be evident to one skilled in the art that the elements of the above described embodiments may be combined or used individually to optimize customer satisfaction, while remaining within the scope of the present invention.

It will be readily apparent that many of the features and design techniques can be applied with equal utility to any mobile home. There are other and various embodiments within the scope of the invention. For example, there is a motorized recreational vehicle with living space and storage space consisting of a vehicle body of unibody construction having an front end, bottom, sidewalls, and top, and being further configured with an openable rear end and an access door proximate the front end, a steerable front wheel suspension system, a rear wheel suspension system, and an engine and drive train system connected to either or both the front wheel and rear wheel suspension systems. There is a driver's station disposed within the vehicle body, with a driver's steering console at the driver's station connected to the steerable front wheel suspension system for providing directional control capability for the vehicle.

There is at least one expandable living compartment disposed within the vehicle body, having a floor structure spaced above the vehicle bottom, and at least one extendible component or bump out, having first, second, and third walls, a floor and a roof. The walls, floor and roof each have interior and exterior surfaces and inboard and outboard sides. The extendible component is extendible from within the living compartment through a respective sidewall opening of the vehicle body.

There is at least one storage area disposed within the vehicle body, at least partially extending between the vehicle bottom and the floor structure, where the storage area is accessible at least through the openable rear end. The floor of the extendible component when it is fully extended is substantially level with the floor structure of the living compartment.

The floor structure may have at least one retractable floor panel and floor panel operating mechanism configured such that when the extendible components are extended, the floor panel is extendible to and is supportable in a position flush with the interior surface floor of the extendible component, and the floor panel is retractable beneath the level of the extendible component floor for retraction of the extendible component.

The floor panel operating mechanism consists of a fixed floor panel inboard edge support, a floor panel lifting mechanism, and a retractable floor panel outboard edge support. The floor panel lifting mechanism may consist of at least one pneumatic actuator disposed between the floor structure and the floor panel. Also, the drivers steering console may be retractable from the driver's station when not in use, freeing up this space for living activities when the vehicle is stationary. The storage area may extend vertically upward behind the living compartment, and it may consist of upper and lower levels and a mechanism for elevating objects from ground level to the upper level. Also, there may be a rear end ramp extendible to ground level for delivering and removing a vehicle or other wheeled loads into and out of the storage area. The openable rear end may be a hatch hingedly attached to the vehicle body, and be configured with components of a heat exchanger airflow system servicing the living compartment.

Sidewall openings in the vehicle body extend upward to the outboard edge of the vehicle top, and the inboard edge of the bump out roof is configured for mating with the outboard edge of the vehicle top. The inboard edge of the bump out roof is configured to mate with the outboard edge of the interior or ceiling side of the vehicle top, thereby forming a substantially flush joint providing a continuous ceiling profile and a continuous exterior top profile extending across the expandable living compartment.

Further, the inboard edge of the bump out roof may incorporate an inwardly directed, upwardly biased, downwardly deformable interior flap, and the outboard edge of the vehicle top within the sidewall openings may have a hinged exterior flap. The hinged exterior flap lies secured against the exterior surface of the outboard wall of the bump out and the interior flap normally contacts the interior or ceiling surface of the vehicle top when the bump out is retracted. The interior flap is deformable downward for clearance and exterior flap is free for outward motion during extension of the extendible bump out component. The interior flap is reformable upward for engagement with the outboard edge of the top, and the exterior flap is disposed on or proximate the interior flap thereby forming the joint between the extended bump out and the vehicle's unibody shell.

The deformable interior flap may consist of first and second stressed skins defining a longitudinal chamber within, where the chamber consists of a variable volume by which at least one skin may be deformed for articulating motion or upward and downward movement of the deformable flap. The chamber may be at least partially filled with compressible foam.

The vehicle has a flexible membrane connecting the perimeter of each sidewall opening with the bump out or extendible component, thereby isolating the living space or interior of the vehicle from the outside environment. Also, the vehicle body may consist of stressed skin foam construction using substantially resilient foam materials between the skins.

Another example of the invention is a motorized recreational vehicle as described above, with a wet weight that is less than 80% of its gross vehicle weight rating, providing a substantial payload capability, Yet another example is such a vehicle with a wet weight that is less than 65% of the gross vehicle weight rating of the vehicle. The unibody construction of the vehicle consists of stressed skin foam core laminates. The foam core laminates are bonded together using a high density foam bond. The foam core laminates have interior and exterior skins, and the skins may have one or a plurality of window apertures for mounting windows, where each window aperture has an integral edge flange. The apertures in the exterior skin are smaller than their respective apertures in the interior skin, resulting in a gap between respective edge flanges. The gap may be filled with a thermally non-conductive material against which the window frame or glazing is installed.

A motorized recreational vehicle of the invention may include a plurality of pockets within the sidewalls and front end for receiving stowable side windows and a stowable windshield.

In another aspect of the invention, a deformable member has a variable volume chamber with anterior and posterior ends, fully enclosed by at least two flexible surface skins and anterior and posterior flexible membrane chamber ends, where each skin has a length and parallel first and second ends to their length. The first skin is longer than the second skin. Their first ends are joined in a fixed, parallel relationship, and their second ends are likewise joined in a fixed, parallel relationship. The volume of the chamber is occupied by a fluid or other removable or compressible medium. There is a fluid pump or control mechanism such as a heat source or temperature controller within or proximate the chamber for manipulating the volume of the chamber such at least one skin is placed in a concave or curved configuration of variable radius. Varying the average radius of curvature of at least one skin deforms the member. A portion of the volume of the chamber may be a flexible, non-compressible material.

The deformable member may be disposed within a fluid as a flow control surface. The first ends or one or both of the anterior and posterior ends of the skins may be attached to a reference structure from which the member extends, providing a reference from which movement of the member by deformation is relative. The flow control surface or function of the member may be chosen from the group of fluid flow control surfaces consisting of wings, ailerons, stabilizers, elevators, rudders, vanes, valves, shunts, and trim control flaps. The deformable member may be configured to be or provide a propulsion mechanism for use in a fluid medium to pump fluid or propel an object through the fluid. The deformable member may form at least part of a roof of a slide out component of a motorized recreational vehicle.

The deformable member may have anterior and posterior walls having interior and exterior skins, where the exterior skins are elastically connected to the anterior and posterior ends of the deformable member by exterior side wall membranes extending from the flexible membrane chamber ends, and the interior skins are connected to the deformable member by interior elastic membranes. The exterior and interior membranes may be a common continuous membrane.

As yet another example of the invention, there is a motorized recreational vehicle of unibody construction as described above, with at least one storage compartment below the floor of the living compartment, at least a portion of the storage compartment configured as a garage accessible to at least one automobile through an openable hatch disposed in the rear of said vehicle body. The storage compartment may extend upwardly behind the living compartment, and be accessible through a plurality of hatches located along the sidewalls. The garage may be configured to receive at least two or three automobiles or other large objects, including sub-compact cars, compact cars, midsize cars, sports cars, sport utility vehicles, light pick-up trucks, and full size cars, and boats, jet skis, snowmobiles and other recreational toys and tools.

The hatch may be configured to act as a ramp for the loading of an automobile or other object, where the automobile or object is secured to the ramp and raised to a vertical orientation with the closing of the hatch.

The garage may further consist of upper and lower levels disposed posterior to the living compartment. The hatch may have interior and exterior surfaces, first, second, third and forth edges, and be hingeably connected to the vehicle body along one edge, with adjacent opposing edges being configured with air ducts providing a means of communication to a heat exchanging unit within the hatch.

An additional example of the invention is an expandable living compartment in a motorized recreational vehicle as described above, with a floor panel support structure and at least one floor panel of which at least one outboard edge is movable by means of at least one actuator from a lower, downward sloping configuration where at least one extendible component or bump out may be placed in a retracted position over the depressed floor panel, to a raised, level configuration available only when the bump out is extended.

There may be an air pressure source such as a pump or compressed air or wind source whereby the pressure within the expandable living compartment is elevated slightly when the extendible component or bump out is being retracted or extended. This helps to keep the skirt properly deployed as the bump out transitions through the sidewall opening.

The expandable living compartment may have an access system disposed between the floor support structure and a movable floor panel whereby the moveable floor panel can be further lifted in a controlled way from the support structure so as to provide access under the panel for servicing or cleaning. The actuator for this lifting may be a pneumatic bladder. The bump out may use parallel synchronous mechanical driver assemblies or lead screws disposed at the four corners of the extendible component whereby it may be extended and retracted through its sidewall opening with precision. The parallel synchronous drivers may be concealed within the body or shell of the vehicle and the extendible component.

The floor support structure may further include fluid storage tanks defined by a top skin and a bottom skin joined by a continuous sidewall. The bottom skin may be arched upwardly both laterally and longitudinally, so as to have a higher center section and four lower corners, and the interior volume may be divided into up to four fluid storage tanks, where each tank extends from the center section to a respective lower corner for easy drainage.

The expandable living compartment may have flexible floor panel supported along a centerline thereof by the floor support structure such that the opposing outboard edges of the floor panel rest in a lower, downward sloping configuration until elevated by at least one actuator to proper floor level.

The vehicle of the invention may be further configured with a windshield aperture and an openable and stowable windshield assembly, and may have a retractable screen assembly for use when the windshield is open so as to protect the living space from insects.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

I claim:

1. A motorized recreational vehicle said vehicle comprising:
   at least one expandable living compartment disposed within a vehicle body;
   said expandable living compartment comprising at least one extendible component having first, second, and third walls, a floor and a roof, said walls, floor and roof each having interior and exterior surfaces and inboard and outboard sides, said extendible component being extendible from within said living compartment through a respective sidewall opening of said vehicle body;
   wherein said inboard edge of said roof of said extendible component is configured to mate with the outboard edge of said interior of said top of said vehicle body thereby forming a substantially flush joint providing a continuous ceiling profile and a continuous exterior top profile extending across said expandable living compartment;
   said inboard edge of said roof of said extendible component comprising an inwardly directed, upwardly biased, downwardly deformable interior flap,
   said outboard edge of the top within said sidewall opening comprising a hinged exterior flap,
   said hinged exterior flap lying secured against the exterior surface of the outboard wall of said extendible component and said interior flap normally contacting the interior surface of said top when said extendible compartment is retracted,
   said interior flap being deformable downward for clearance and said exterior flap being free for outward motion during extension of said extendible component,
   said interior flap being reformable upward for engagement with said outboard edge of said top, said exterior flap being disposed proximate thereto thereby forming said joint.

2. A motorized recreational vehicle according to claim 1, a floor of said extendible component when said extendible component is fully extended being substantially level with said floor structure of said living compartment.

3. A motorized recreational vehicle according to claim 2, said floor structure comprising
   at least one retractable floor panel and floor panel operating mechanism configured such that when said extendible components are extended, said floor panel is extendible to and is supportable in a position flush with said interior surface of said floor of said extendible component, and such that said floor panel is retractable beneath the level of said floor of said extendible component for retraction of said extendible component.

4. A motorized recreational vehicle according to claim 3, said floor panel operating mechanism comprising a fixed floor panel inboard edge support, a floor panel lifting mechanism, and a retractable floor panel outboard edge support.

5. A motorized recreational vehicle according to claim 4, said floor panel lifting mechanism comprising at least one pneumatic actuator disposed between said floor structure and said floor panel.

6. A motorized recreational vehicle according to claim 1, said deformable interior flap comprising a first and second stressed skins defining a longitudinal chamber within, said chamber comprising a variable volume by which at least one said skin may be deformed for upward and downward movement of said deformable flap.

7. A motorized recreational vehicle according to claim 6, said chamber is at least partially filled with compressible foam.

8. A motorized recreational vehicle according to claim 1, said vehicle further comprising a flexible membrane connecting the perimeter of said sidewall opening with said extendible component, thereby isolating the interior of said vehicle from the exterior of said vehicle with respect to said sidewall opening.

9. A motorized recreational vehicle according to claim 1, said vehicle body comprising stressed skin foam construction using substantially resilient foam materials between skins.

10. A motorized recreational vehicle comprising:
a vehicle body of substantially unibody construction from stressed skin foam core laminates having front end, bottom, sidewalls, and top;
a suspension system;
an engine and drive train;
a living compartment; and
wherein said motorized recreational vehicle has a wet weight that is less than 80% of a gross vehicle weight rating of said motorized recreational vehicle.

11. A motorized recreational vehicle according to claim 10, said motorized recreational vehicle having a wet weight that is less than 65% of said gross vehicle weight rating of said motorized recreational vehicle.

12. The motorized recreational vehicle according to claim 10 wherein said foam core laminates are bonded together using a high density foam bond.

13. The motorized recreational vehicle according to claim 10 wherein said foam core laminates have interior and exterior skins, said skins having a plurality of window apertures for the mounting of windows, each said window aperture having an integral edge flange, said apertures in said exterior skin being smaller than respective said apertures in said interior skin thereby resulting in a gap between respective said edge flanges, said gap being filled with a thermally non-conductive material.

14. The motorized recreational vehicle of claim 10 further comprising a plurality of pockets within said sidewalls and front end of said vehicle body, said pockets configured to receive stowable side windows and a stowable windshield.

15. A deformable member comprising
a variable volume chamber having anterior and posterior ends, enclosed by at least two flexible surface skins and anterior and posterior flexible membrane chamber ends, each said skin having a length and parallel first and second ends to said length, said first skin being longer than said second skin, said first ends joined in a fixed, parallel relationship, said second ends joined in a fixed, parallel relationship, and a control for manipulating the volume of said chamber such at least one skin is placed in a concave configuration of variable radius.

16. A deformable member according to claim 15, a portion of said volume comprising a flexible, non-compressible material.

17. The deformable member of claim 15 wherein said deformable member is disposed within a fluid as a flow control surface.

18. The deformable member of claim 15, wherein said first ends are attached to a reference structure.

19. The deformable member of claim 15, wherein at least one of said anterior and posterior ends of said deformable member are attached to a reference structure.

20. The deformable member of claim 17 wherein said flow control surface is chosen from the group of fluid flow control surfaces consisting of wings, ailerons, stabilizers, elevators, rudders, vanes, valves, shunts, and trim control flaps.

21. The deformable member of claim 15 wherein said deformable member is a propulsion mechanism for use in a fluid medium.

22. The deformable member of claim 15 wherein said deformable member forms at least part of a roof of a slide out component of a motorized recreational vehicle.

23. The deformable member of claim 22 wherein said slide out has anterior and posterior walls having interior and exterior skins, said exterior skins being elastically connected to said anterior and posterior ends of said deformable member by exterior side wall membranes extending from said flexible membrane chamber ends, said interior skins connected to said deformable member by interior elastic membranes.

24. A motorized recreational vehicle comprising:
a vehicle body of substantially unibody construction having front end, bottom, sidewalls, rear and top;
a suspension system;
an engine and drive train;
a living compartment; and
at least one storage compartment below the floor of the living compartment, at least a portion of said storage compartment configured as a garage accessible to at least one automobile through an openable hatch disposed in said rear of said vehicle body;
wherein said garage further comprises upper and lower levels disposed posterior to said living compartment.

25. The motorized recreational vehicle of claim 24 wherein said automobiles are chosen from the group of automobiles consisting of sub-compact cars, compact cars, midsize cars, sports cars, sport utility vehicles, light pick-up trucks, and full size cars.

26. The motorized recreational vehicle of claim 24 wherein said hatch is configured to act as a ramp for the loading of said automobile.

27. The motorized recreational vehicle of claim 26 wherein said automobile is secured to said ramp and raised to a vertical orientation with the closing of said hatch.

28. An expandable living compartment in a motorized recreational vehicle, said living compartment comprising:
an elevated portion of said motorized recreational vehicle, said portion comprising a roof, floor, front end, back end, and first and second side walls,
opposing first and second extendible components, said components having interior and exterior surfaces, and being disposed within an aperture in opposing frist and second said side walls;

said floor comprising a floor panel support structure and at least one floor panel of which at least one outboard edge is movable by means of at least one actuator from a lower, downward sloping configuration wherein said first and second extendible components may be placed in a retracted position over said floor panel, to a raised, level configuration available only when said extendible components are extended, and such that when said first and second extendible components are retracted, floor sections of said first and second extendible components contact each other.

29. The expandable living compartment according to claim 28 further comprising a flexible skirt disposed around the circumference of said aperture and connecting said body of said vehicle to said exterior surfaces of said extendible component.

30. The expandable living compartment of claim 29 further comprising an air pressure source whereby the pressure within said expandable living compartment is elevated when said extendible component is being retracted or extended.

31. The expandable living compartment of claim 28 further comprising an access system disposed between said support structure and said movable floor panel whereby said moveable panel may be further lifted in a controlled way from said support structure so as to provide access under said moveable panel.

32. The expandable living compartment according to claim 28 wherein said actuator comprises at least one pneumatic bladder.

33. The expandable living compartment according to claim 28 further comprising a pneumatically actuated latch mechanism disposed between said floor panel and said support structure.

34. The expandable living compartment according to claim 28 further comprising parallel synchronous drivers disposed at four corners of said interior of said extendible component whereby said extendible component may be extended and retracted through a respective said sidewall opening.

35. The expandable living compartment according to claim 34 wherein said parallel synchronous drivers are concealed within said body of said vehicle and said extendible component.

36. The expandable living compartment according to claim 28 wherein said floor panel comprises a flexible floor panel supported along a centerline thereof by said support structure such that opposing said outboard edges rest in said lower, downward sloping configuration until elevated by said at least one actuator.

* * * * *